US007707062B2

(12) United States Patent  
Abramowicz

(10) Patent No.: US 7,707,062 B2  
(45) Date of Patent: Apr. 27, 2010

(54) METHOD AND SYSTEM OF FORECASTING CUSTOMER SATISFACTION WITH POTENTIAL COMMERCIAL TRANSACTIONS

(76) Inventor: Michael Abramowicz, 5215 Washington Blvd., Arlington, VA (US) 22205

( * ) Notice: Subject to any disclaimer, the term of this patent is extended or adjusted under 35 U.S.C. 154(b) by 300 days.

(21) Appl. No.: 11/798,865

(22) Filed: May 17, 2007

(65) Prior Publication Data

US 2008/0288326 A1    Nov. 20, 2008

(51) Int. Cl.  
*G06F 17/30* (2006.01)

(52) U.S. Cl. .......................................... 705/10; 705/26

(58) Field of Classification Search ................... 705/10, 705/26  
See application file for complete search history.

(56) References Cited

U.S. PATENT DOCUMENTS

| 7,340,409 | B1 * | 3/2008 | Ulwick ........................ 705/10 |
| 2004/0267596 | A1 * | 12/2004 | Lind et al. .................... 705/10 |
| 2005/0131732 | A1 * | 6/2005 | Potenza ........................ 705/1 |
| 2005/0177414 | A1 * | 8/2005 | Priogin et al. ................. 705/10 |
| 2008/0040206 | A1 * | 2/2008 | Silvera et al. ................. 705/11 |
| 2008/0152122 | A1 * | 6/2008 | Idan et al. .............. 379/265.07 |

OTHER PUBLICATIONS

Robin Hanson, Logarithmic Market Scoring Rules for Modular Combinatorial Information Aggregation, Jan. 2002, Department of Economics George Mason University.*  
Robin Hanson, Combinatorial Information Market Design, Information Systems Frontiers 5:1 107-109, 2003. Kluwer Academic Publishers.*  
Anthony J. Hayter, Probability and Statistics for Engineers and Scientists. PWS Publishing Company, a division of International Thomson Publishing. Boston, Massachusetts 1996.*  
Robin Hanson "Combinatorial Information Market Design", Information Systems Frontiers 5:1, 107-119, 2003, copyright 2003 Kluwer Academic Publishers, Manufactured in The Netherlands.  
Allan H.Murphy and Robert L. Winkler, "Scoring Rules in Probability Assessment and Evaluation", Acta Psychologica 34 Subjective probability (G. de Zeeuw et al., eds.) 1970, 273-286 copyright North-Holland Publishing Company.  
Nicholas Chan, Ely Dahan, Adlar Kim, Andrew Lo & Tomaso Poggio, Securities Trading of Concepts (STOC) (2002), available at http://www.anderson.ucla.edu/faculty/ely.dahan/content/chan_dahan_lopoggio.pdf.

(Continued)

*Primary Examiner*—Beth V Boswell  
*Assistant Examiner*—Stephanie Zagarella  
(74) *Attorney, Agent, or Firm*—McGinn IP Law Group, PLLC

(57) ABSTRACT

A method and structure for predicting a satisfaction a consumer will experience contingent on accepting one or more offers from potential sellers. A request is received from a consumer describing one or more transactions in which the consumer may wish to engage. One or more offers are received from one or more potential sellers in response to the request. One or more predictive assessments are received from one or more predictors corresponding to one or more of these offers, each predictive assessment predicting a satisfaction that the consumer will experience contingent on accepting one or more offers from the potential sellers. For one or more of these offers, at least one aggregated prediction is calculated, based on the corresponding predictive assessments, according to a prediction aggregation mechanism.

19 Claims, 15 Drawing Sheets

OTHER PUBLICATIONS

Michael Abramowicz, "Information Markets, Administrative Decisionmaking, and Predictive Cost-Benefit Analysis," University of Chicago Law Review 71:933,2004.

Michael Abramowicz, "Deliberative Information Markets for Small Groups", University of Chicago Law Review, pp. 101-125.

Robert Hanson, Symposium on the possibility of science funding as an 'idea futures' market. "Could Gambling Save Science? Encouraging an Honest Consensus", Social Epistemology, 1995, vol. 9, No. 1, 3-33.

Michael Abramowicz, "Cyberadjudication", 86 Iowa Law Review, 534, 2000-2001.

Justin Wolfers and Eric Zitzewitz, "Prediction Markets", Journal of Economic Perspectives, vol. 18, No. 2, Spring 2004, pp. 107-126.

* cited by examiner

METHOD AND SYSTEM OF FORECASTING CUSTOMER SATISFACTION WITH POTENTIAL COMMERCIAL TRANSACTIONS

BACKGROUND OF THE INVENTION

1. Field of the Invention

The present invention relates generally to techniques for conducting electronic commerce and providing information to consumers deciding whether to enter into commercial transactions. More specifically, tools for incentivizing and aggregating forecasts are applied to the commercial realm, wherein assessments are provided of a buyer's expected satisfaction with a specific good or service, should the customer decide to purchase it.

2. Description of the Related Art

Potential buyers of goods and services often seek out at least two types of information: (1) which particular species of good or service will best suit their needs, and (2) which suppliers of goods and services will provide them the best deal. Obtaining these types of information is costly, but failure to obtain adequate information can lead to consumer dissatisfaction. A variety of tools and resources help to solve each of these problems.

In one conventional approach, rating institutions may assess particular products. For example, users of amazon.com can find information on how satisfied previous consumers have been with particular products. Similarly, readers of *Consumer Reports* and numerous other publications may obtain information about the quality of particular products, including overall ratings.

A significant limitation of these approaches is that the overall ratings do not generally seek to customize recommendations for particular customers. Individual customers must still expend considerable effort to identify the strengths and weaknesses of each vendor or product to determine whether it will meet the customers' own needs.

In another approach, collaborative filtering technologies have helped to customize recommendations for particular consumers. For example, Netflix.com can recommend particular movies to customers based in part on their evaluation of other movies that they have seen. The collaborative filtering techniques will place more weight in making recommendations for a particular customer on the evaluations of other customers who have similar preferences.

Collaborative filtering technology, however, will not work well for product categories in which past buying history provides few clues about the buyer's needs. A customer's movie preferences will not be of much use in determining which lawnmower a first-time homeowner should buy. In addition, collaborative filtering will not work well for new products, at least so long as there is insufficient data about other users' reactions.

Therefore, in many contexts, customers rely on non-technological sources of information. For example, customers may ask knowledgeable friends about purchases. But sometimes, a customer may not know of or may not have immediate access to any friends who are experts on the relevant area of purchase. And so, many customers rely on advice from salespeople at retail sales establishments to educate themselves about products.

This approach has its own perils, because retail employees' incentives may lead them to seek to achieve goals other than maximizing consumer satisfaction, such as maximizing their employers' profit. Some retail establishments may be able to achieve reputations for providing honest advice, but the equilibrium level of honesty may be lower than the level that, with perfect information, would maximize the joint surplus of the retailer and the consumer.

Meanwhile, feedback mechanisms can help customers decide whether to do business with particular vendors. Customers on eBay.com, for example, can view sellers' "feedback scores." Sellers with high feedback scores can generally be presumed to be reliable.

Customers, however, must still often choose among many competing vendors with similar feedback profiles. Moreover, the vendors may be less likely to provide advice to customers about which specific products to buy, and so consumers will still need to rely on some other means of identifying a specific product that fits their needs.

Thus, a need continues to exist for providing information to customers about potential purchases, preferably in a way that can overcome at least some of the above problems.

SUMMARY OF THE INVENTION

In view of the foregoing, and other, exemplary problems, drawbacks, and disadvantages of the conventional systems, it is an exemplary feature of the present invention to provide a structure (and method) that overcomes the above-identified problems in providing information to potential buyers of goods and services.

It is another exemplary feature of the present invention to provide a method that requires little investment of time by the consumer, customizes recommendations to customers' specific needs, overcomes incentives of individuals to misrepresent the products and services that they themselves offer, and takes into account the strengths and weaknesses simultaneously of different vendors and different products.

The present invention accomplishes these and other exemplary features by providing a prediction aggregation mechanism that assesses specific offers made by potential vendors in response to requests by buyers. Participants serving in the rating role of the present invention have financial or reputational incentives to make accurate forecasts of a customer's expected satisfaction with a good or service, should the customer decide to purchase that good or service.

Therefore, in a first exemplary aspect, described herein is an apparatus including an input section to receive user inputs; a memory to store the user inputs; and a calculator, wherein the input section receives a request from a consumer describing one or more transactions in which the consumer may wish to engage, at least one offer from at least one potential seller of the one or more transactions, and one or more predictive assessments from one or more predictors corresponding to at least one offer, each predictive assessment predicting a satisfaction the consumer will experience contingent on accepting one or more offers from at least one potential seller, the consumer request, each at least one offer, and each at least one or more predictive assessments being stored in the memory, and the calculator uses the predictive assessments to calculate an aggregated prediction for at least one offer, based on a prediction aggregation mechanism.

In a second exemplary aspect of the present invention, also described herein is a signal-bearing medium tangibly embodying a program of machine-readable instructions executable by a digital processing apparatus to perform a method for predicting a satisfaction that a consumer will experience contingent on accepting one or more offers from potential sellers, including receiving a request from a consumer describing one or more transactions in which the consumer may wish to engage; receiving one or more offers from one or more potential sellers in response to the request;

receiving one or more predictive assessments from one or more predictors corresponding to one or more of these offers, each predictive assessment predicting a satisfaction that the consumer will experience contingent on accepting one or more offers from the potential sellers; and calculating, for one or more of these offers, at least one aggregated prediction based on the corresponding predictive assessments, according to a prediction aggregation mechanism.

In a third exemplary aspect of the present invention, also described herein is a computer-implemented method for predicting a satisfaction a consumer will experience contingent on accepting one or more offers from potential sellers, including receiving a request from a consumer describing one or more transactions in which the consumer may wish to engage; receiving one or more offers from one or more potential sellers in response to the request; receiving one or more predictive assessments from one or more predictors corresponding to one or more of these offers, each predictive assessment predicting a satisfaction that the consumer will experience contingent on accepting one or more offers from the potential sellers; and calculating, for one or more of these offers, at least one aggregated prediction based on the corresponding predictive assessments, according to a prediction aggregation mechanism.

In a fourth exemplary aspect of the present invention, also described herein is an apparatus, including an input section to receive user inputs; a memory to store the user inputs; and a calculator, wherein the input section receives a request from a consumer describing one or more transactions in which the consumer may wish to engage, at least one offer from a plurality of potential sellers, not all of which are under an economic control of a single individual or entity, of the one or more transactions, and one or more predictive assessments from one or more predictors corresponding to the at least one offer, each predictive assessment predicting a satisfaction the consumer will experience contingent on accepting one or more offers from the at least one potential seller, the consumer request, each at least one offer, and each at least one or more predictive assessments being stored in the memory, and the calculator uses the predictive assessments to calculate at least one aggregated prediction for the at least one offer, based on a scoring rule.

The present invention, therefore, offers a variety of advantages over previous approaches to providing information to consumers. It can harness information from diverse sources about the suitability of particular goods or services, as offered by particular individuals, for particular consumers.

Because the information depends on evaluations of independent predictors who have financial incentives to make accurate predictive assessments, consumers will not need to spend as much effort assessing the honesty and motivations of those who offer them advice. They can also be confident that those providing them with information will seek to respond to the consumers' individual needs, as described by those consumers.

The present invention can be useful for a wide array of goods and services, and can be especially useful for purchases that are cognitively demanding, such as health care products, legal services, and insurance. It can also be useful in an e-commerce environment or in a more traditional retail setting.

BRIEF DESCRIPTION OF THE DRAWINGS

The foregoing and other purposes, aspects, and advantages will be better understood from the following detailed description of exemplary embodiments of the invention with reference to the drawings, in which.

DETAILED DESCRIPTIONS OF EXEMPLARY EMBODIMENTS OF THE INVENTION

Figure 1:
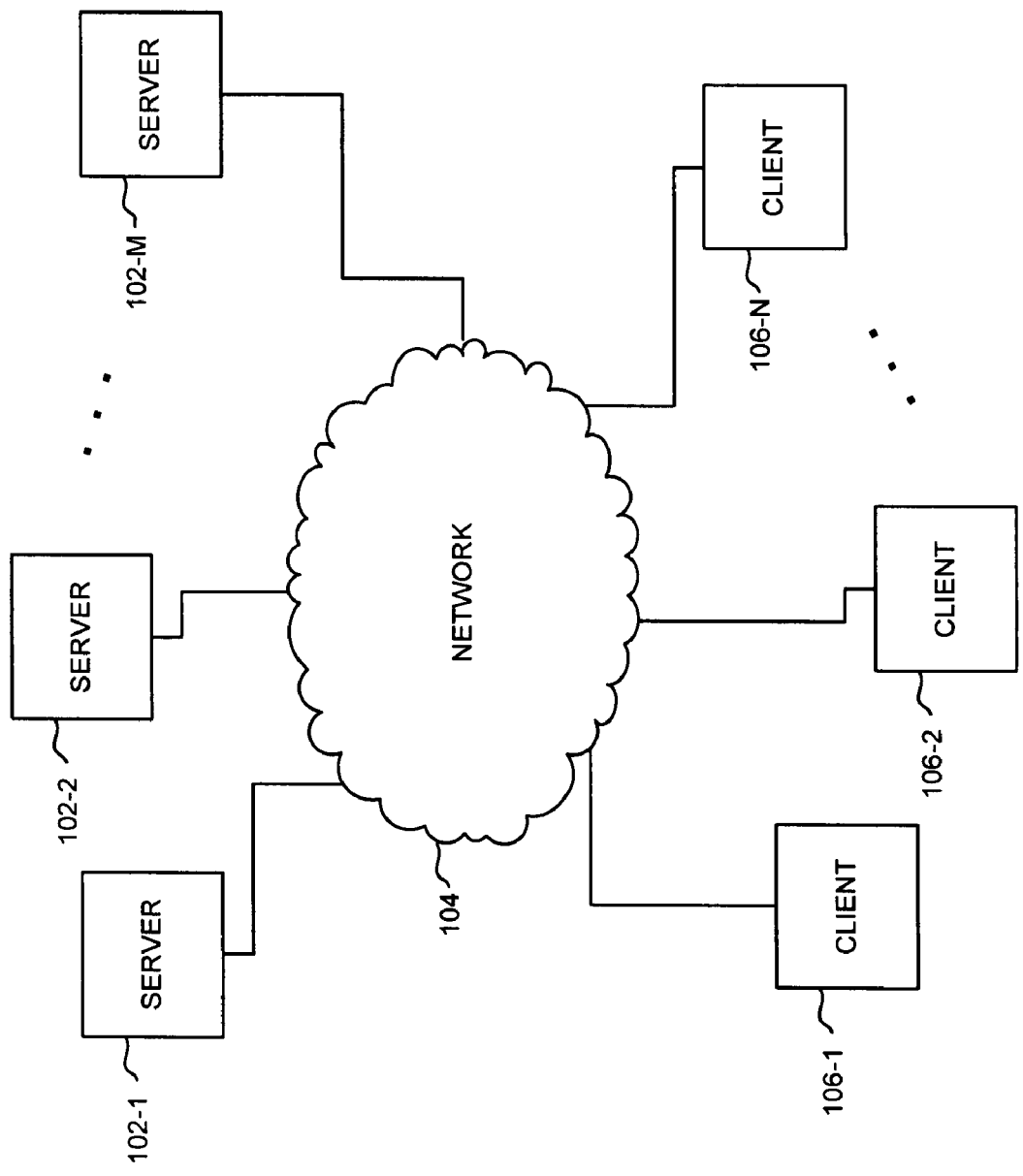
FIG. 1 exemplarily illustrates a series of client and server computers connected to a computer network to make possible the computer-implemented method of the present invention.

Referring now to the drawings, and more particularly to FIGS. 1-15, exemplary embodiments of the method and structures according to the present invention will now be described.

The present invention provides methods and apparatus for predicting the satisfaction of a consumer with an offer for purchase of a good or service based on one or more predictive assessments and for providing aggregated predictions to the consumer.

In an initial step of a first exemplary embodiment of the method, a consumer makes a particular request, providing a general or specific indication of what the consumer seeks to purchase. One or more potential providers of the good or service (sellers) can then submit offers that are responsive to the consumer's request. Predictors may enter predictive assessments of the consumer's satisfaction with one or more of the offers, and these predictive assessments are aggregated in accordance with a prediction aggregation mechanism. A computer database system accessible from a computer network such as the Internet can display requests and the corresponding offers, to the consumer and/or to the potential predictors.

One aspect of some of the various embodiments of the present invention is the use of a prediction aggregation mechanism. A prediction aggregation mechanism, as defined more fully below, includes an algorithm for producing aggregated predictions on the basis of the predictive assessments of one or more predictors, each of whom may gain or lose money or points based on the accuracy of their predictive assessments, as determined by the algorithm specified by the prediction aggregation mechanism.

For example, one type of prediction aggregation mechanism is a prediction market. In such a market, predictors can buy or sell contracts from or to one another or from or to an automated market maker, where the ultimate value of these contracts depends in some way at least in part on the expected consumer satisfaction. In a prediction market, a potential predictor who believes that others have previously underestimated the consumer's satisfaction could buy contracts, causing an increase in the price of the contracts, thus changing the predictive assessment that may be presented to the consumer.

Based on this summary of the present invention, it is noted that previous inventions lack one or more of the exemplary significant features of the present invention. For example, U.S. Patent Application Publication 20050043829 to Rossides, discloses a method for using a computer database system to compare products and services. An "author" of a product bet contest defines a criterion by which one or more products are to be measured, and individual "bettors" may then risk money. They would be betting on the ultimate decision of a "judge" of that contest. A "viewer" could look at current bets. For example, a restaurateur might author a product bet contest comparing her own restaurant to another restaurant, predicting which restaurant a specified judge would prefer. This might provide the restaurant owner a means of credibly conveying information about the restaurant's quality to potential diners.

The current invention differs from U.S. Patent Application 20050043829 in several ways. For example, the invention differs in what the "bettors" are predicting. In the present invention, the "author" is a consumer, and third-party bettors are anticipating that consumer's satisfaction with each of various possible offers. U.S. Patent Application 20050043829 does not disclose a method including bets on the satisfaction of the author of the product contest. In addition, in the present invention, although consumers themselves may be interested in comparing bettors' forecasts of satisfaction for each of various products, the bettors themselves are not directly making comparative assessments, but instead are predicting satisfaction on an offer-by-offer basis. Patent Application 20050043829 comprises a noncomparative analysis only for a particular type of question, which it describes as a "Worth Learning About" question and which is not relevant here.

U.S. Pat. No. 6,970,839 (Nov. 29, 2005) to Jakobsson, meanwhile, discloses a method for generating recommendations from market-based financial instrument prices. This method provides recommendations for choosing among sources of goods or services in part by "determining prices of financial instruments characterizing opinions regarding a plurality of sources of goods or services, each of the financial instruments being associated with a corresponding one of the sources and indicating one or more bets placed regarding performance of that source." For example, the market may be forecasting "the number of clients that [each] source has per time unit," and participants in the market can seek to correct erroneous forecasts based on their own information.

In some embodiments of the present invention, the aggregated predictions for a particular potential consumer are made in part based on the prices of what might be conceived of as financial instruments. U.S. Pat. No. 6,970,839, however, does not predict a particular user's satisfaction with each of one or more products or services that the user may purchase. Rather, the financial instruments correspond to the market's "opinions regarding a plurality of sources of goods or services."

None of the illustrations or claims of the patent includes a forecast of a particular consumer's satisfaction with particular sources for a particular request made by the consumer. U.S. Pat. No. 6,970,839 provides a method for assessing "sources" of goods or services, not particular individualized offers from sources of goods or services.

According to one exemplary embodiment of the present invention, the consumer may be given an opportunity to make one or more purchases, for example, by clicking on a link corresponding to one of the offers and following further instructions. In another embodiment, the consumer may be given an option of having one or more purchases made automatically on his or her behalf. The method would base the decision of whether to make an automatic purchase for the consumer in part on the aggregated predictions of the consumer's eventual satisfaction with possible purchases.

According to another embodiment of the invention, the consumer may be given some opportunity at a later time to record the consumer's satisfaction with the purchase or purchases. This satisfaction may be measured in a variety of ways, for example by reporting of the consumer's gross consumer surplus. This feedback may be used to help determine compensation for the predictors, depending on the algorithm of the prediction aggregation mechanism.

According to an embodiment of the invention, the prediction aggregation method also might be used to predict the consumer's satisfaction if the consumer chooses not to accept any of the offers and/or if the consumer chooses to wait for more offers. The consumer may later have an opportunity to indicate satisfaction with either of these choices. For example, a consumer might report that the consumer was satisfied with a decision not to make a purchase, because the consumer found a suitable solution through means other than the method disclosed here.

A. Introduction to Apparatus

In view of the brief comparison description above, the present invention will be illustrated in more detail in the context of an information processing system implemented over a computer network, although it should be noted that the methods of the present invention are not necessarily confined to implementation on such computer networks. FIG. 1 illustrates an exemplary information processing system 100. The system includes one or more "server" computers 102 (which are referred to collectively herein as the "server") and one or more "client" computers 106 (operated by individuals, groups, or computer programs functioning as agents, all of whom are herein referred to as "users") that communicate with the server.

In FIG. 1, there are N client computers 106-i, i=1, 2, . . . , N, and M server computers 102-j, j=1, 2, . . . , M. Each computer is physically or wirelessly coupled to the network 104 at least some portion of time.

The client computers 106 can be mainframe computers, computer workstations, desktop computers, laptop or notebook computers, cell phones, or any other devices containing microprocessors or other means of processing information capable of implementing at least a portion of the method of the present invention. The same is true of the server computers 102. It also noted that a single computer may function as both a client and server computer, as might be true, for example, if the present invention were to be a kiosk in a shopping mall or other location such as a library in which potential buyers might want to consult the objective method of the present invention before committing to a purchase.

The network 104 may be any type of computer network or communications channel, including but not limited to the Internet, local area networks, wide area networks, ad hoc networks, or any combination thereof, and the various computers may be coupled to this network either part time or full time. The invention is applicable to any number, type, combination, and arrangement of client computers, server computers, and networks.

Figure 2:
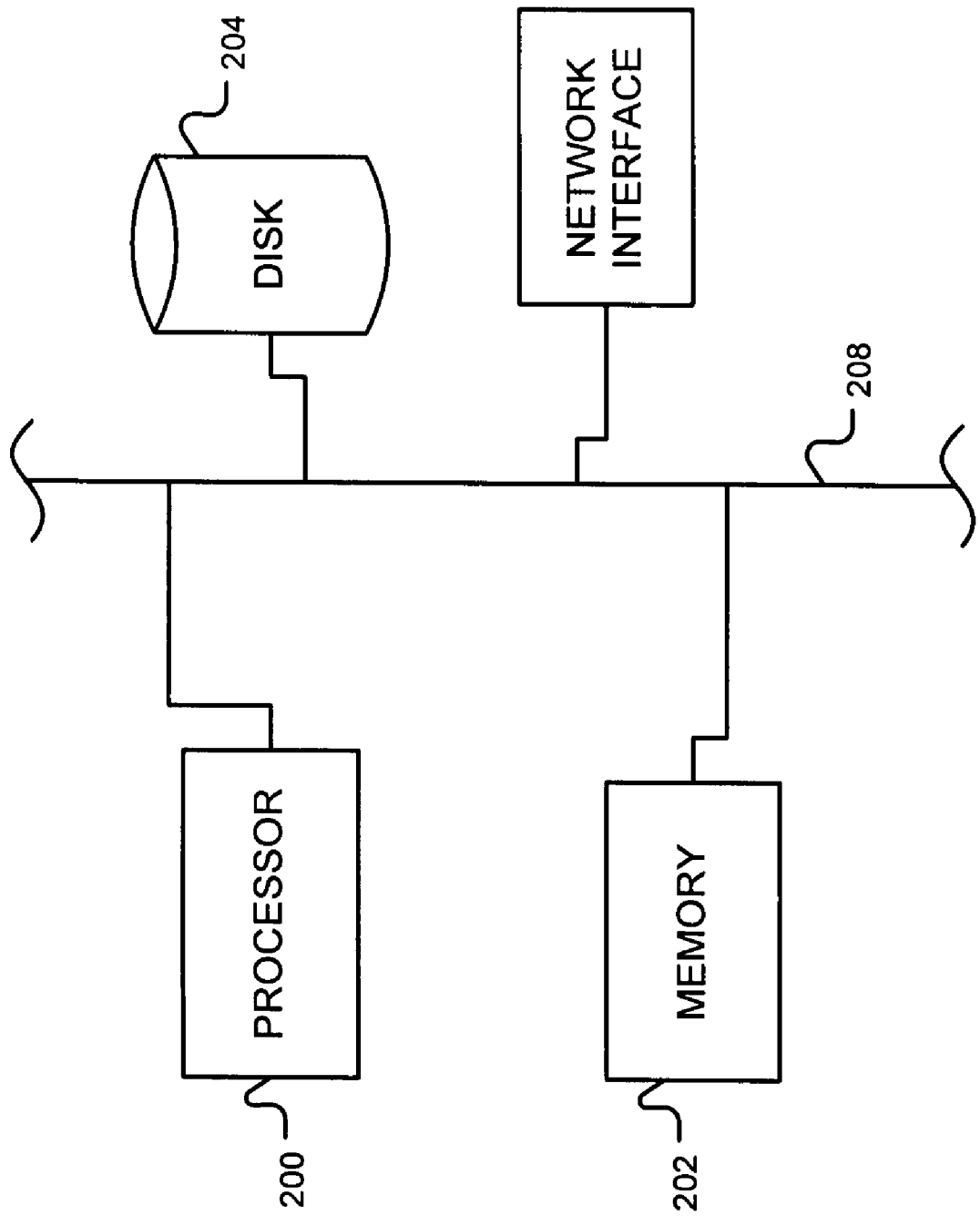
FIG. 2 illustrates an exemplary design for one of the client or server computers for reference in describing the method of the present invention.

For purpose of the following discussions, FIG. 2 shows one possible implementation of each of the client computers 106 or server computers 102 of system 100. This implementation includes a processor 200, one or more memory units 202, 204 and a network interface 206, all of which communicate over a bus 208. The processor 200 may represent a microprocessor, a central processing unit, a digital signal processor, an application-specific integrated circuit, or some combination thereof. FIG. 2 is intended to be illustrative only at this point, since a computer will typically include additional components, such as demonstrated later in FIG. 13.

Figure 3:
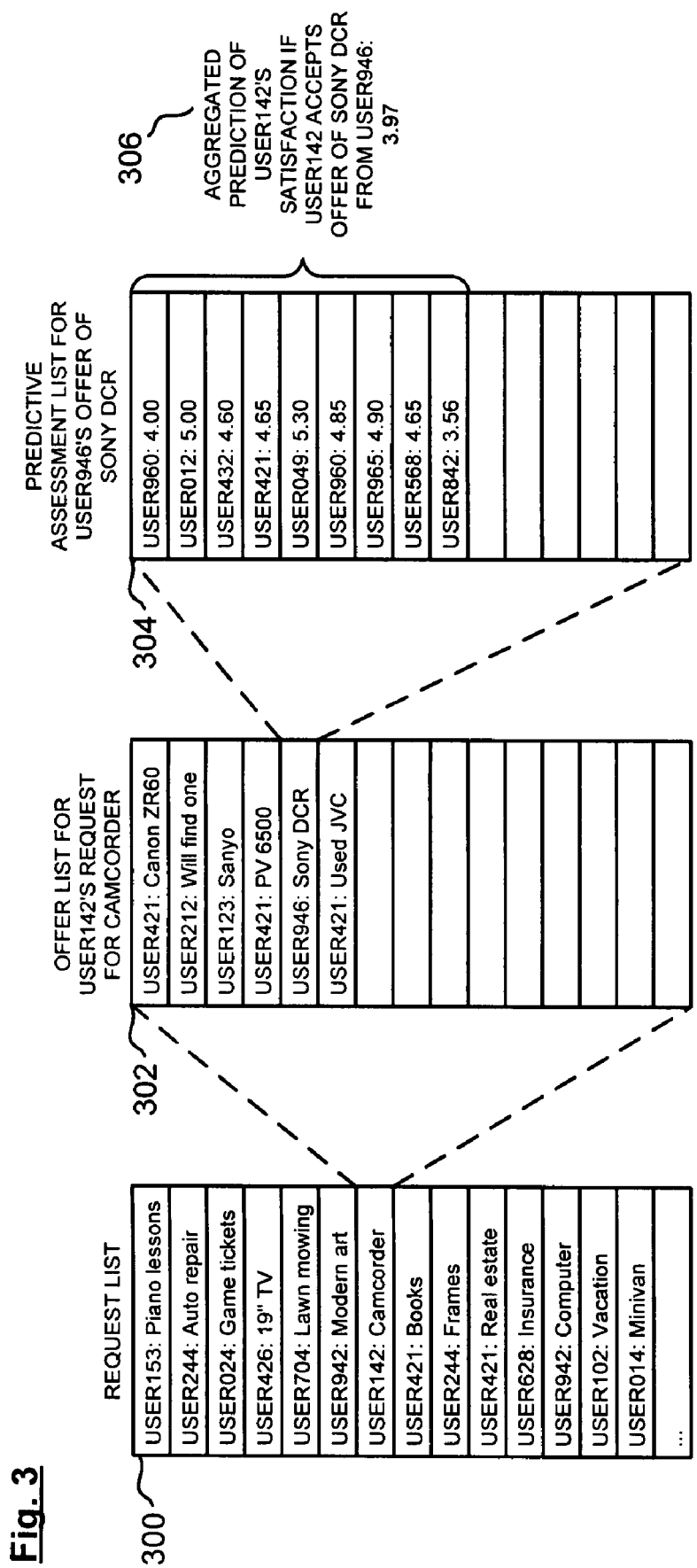
FIG. 3 illustrates the types of information about requests, offers, and predictive assessments that exemplarily are maintained in computer memory by a server.

FIG. 3 offers an illustrative embodiment of some of the information that the server may maintain in its memory store or stores relative to the method of the present invention. First, the server maintains one or more lists or collections of user requests 300. A request is a solicitation for offers to sell a good or perform some type of service. The parties who issue such requests are referred to herein as "consumers," whether they are acting on their own behalf or are assisting other individuals or institutions in making purchases, and whether they are humans or computer-based agents acting on behalf of humans.

For each such request, the server maintains one or more lists or collections of offers from users 302 in response to the request. Parties who issue such offers are referred to herein as "sellers" and likewise include those acting on behalf of others and computer-based agents, as well as humans who actually sell the goods or services directly.

For each offer on each such list, the server maintains one or more lists or collections of predictive assessments 304 made by users of the consumer's expected satisfaction should the consumer accept the offer. Those who make these predictive assessments are herein referred to as "predictors", including again both humans and computer-based agents. It is noted that the system may permit a single user to function in more than one of these capacities, perhaps even for the same consumer request.

The system may be said to perform a step of "processing" a consumer request, a seller offer, or a predictor's predictive assessment when the server computer adds the information in the request, offer, or predictive assessment to the respective list by updating one or more database on the computer with the information or with a hypertext or other referential link providing the relevant information.

For each list of predictive assessments, the server also calculates one or more variables 306 aggregating these predictive assessments, using a prediction aggregation mechanism to be discussed shortly. The server periodically (e.g., after each new predictive assessment is added) updates the value of these variables, which are herein referred to as "aggregated predictions."

It should be apparent that there might be multiple potential sellers who are given an opportunity to make offers to the consumer based on the consumer's request, or there might be only a single seller. For example, an online electronics store might use the present invention, in conjunction with a prediction aggregation mechanism, to help a consumer assess various possible television sets that might best serve the consumer's needs. Similarly, an Internet auction site, such as ebay.com, might permit individual sellers to forecast for one or more potential consumers the expected satisfaction the consumer or consumers might obtain (more specifically, for example, the probability of a positive feedback rating) if a consumer makes the relevant purchase.

The offer for which consumer satisfaction is forecast by the seller might be a generic offer available to all customers, or an offer available only to a particular customer who made a specific request. As yet another example, a real estate agent selling a home might use the invention to help individual consumers or groups of consumers to forecast their satisfaction should they purchase the particular home.

Note also that while in one exemplary embodiment, the offer or offers are in response to customizable requests by a particular consumer, in other embodiments, the offer or offers may be responsive to general requests. For example, a prediction aggregation mechanism might forecast the consumer satisfaction of any consumer who explores a particular category of goods in a web site if the consumer decides to make any purchase from that category.

The word "request" should be understood to constitute even visiting a particular store or website. The invention might, for example, be used to forecast the consumer satisfaction of a consumer who ultimately elects to make any purchase on that website, if the consumer in fact does make a purchase. A given seller might use the invention in more than one way, for example forecasting satisfaction conditional on making any purchases whatsoever and also forecasting satisfaction conditional on the consumer's entering into a particular transaction for a particular good or service.

B. Introduction to Method

Figure 4:
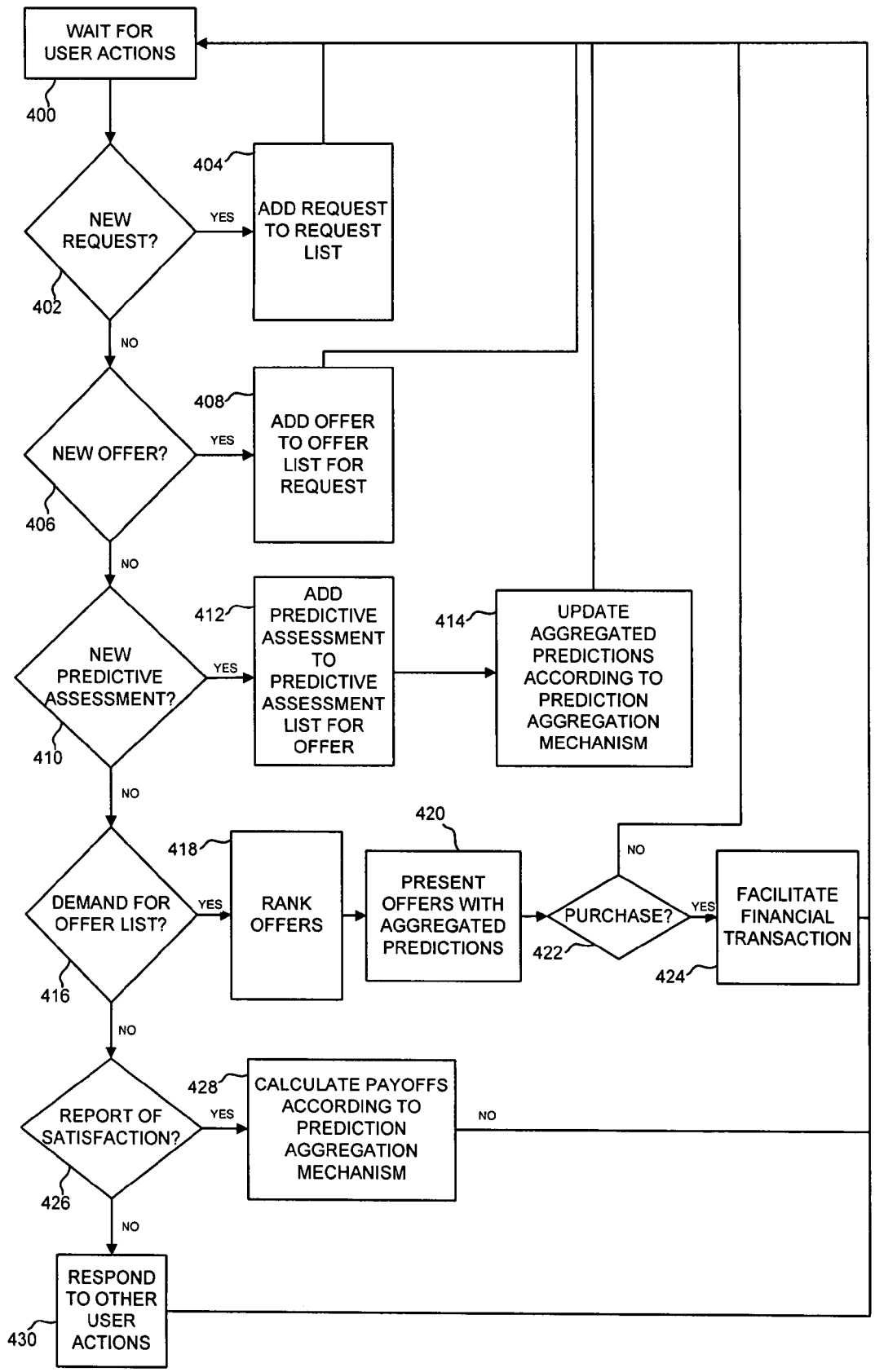
FIG. 4 provides a flow diagram illustrating steps that a server computer might take in responding to user input.

FIG. 4 is a flow diagram illustrating an exemplary embodiment of the method that the system uses to process information. The server waits, in step 400, to respond to various actions by users that augment the database maintained by the system. In response to the addition of a new request by a consumer in step 402, the server adds the request to a request list, in step 404. In response to the addition of a new offer by a seller in step 406, the server adds the request to an offer list corresponding to the request in step 408. In response to the addition of a new predictive assessment by a seller in step 410, the server adds the predictive assessment to a predictive assessment list corresponding to the offer, in step 412, and generates or updates the aggregated predictive assessments for the corresponding offer according to the prediction aggregation mechanism in step 414.

The server is also available to transmit to a client computer used by the consumer a list of offers submitted and information corresponding to these offers. In response to a consumer action requesting such a list, in step 416, the system ranks all offers, in step 418. In step 420 the server provides one or more pieces of information associated with each offer, which information might include the aggregated predictions, the price offered by the seller, and any other information about the seller, such as "feedback" statistics summarizing consumer satisfaction with the seller in past transactions. The ranking of the offers takes into account at least the aggregated predictions and possibly other variables, such as the price offered by the seller. The information transmitted to the consumer may also include identification of one or more offers as recommended offers.

The consumer is given an opportunity to make a purchase corresponding to one or more of the offers, in step 422, whether recommended or not. If the consumer chooses to make a purchase or purchases, the server facilitates a financial transaction between the consumer and each seller according to a price selected by the seller (step 424), and fees are assessed to the consumer and/or the seller. These fees may be fixed or a function of other variables, such as the price, aggregated predictions of additional payments that the consumer must make, and the aggregated predictions of the consumer's satisfaction.

Sometime after the purchase occurs, the consumer may report his or her satisfaction with the purchase, in step 426. This information is then used to calculate payoffs for the predictors according to the prediction aggregation mechanism, in step 428. These payoffs are then credited (for positive payoffs) or assessed (for negative payoffs) for the predictors.

In step 430, the server may also be available to respond to other user actions, such as displaying contact information. The server will be said to have "processed" a request, offer, or predictive assessment, respectively, when the server adds it to the appropriate list, such as exemplarily illustrated in FIG. 3. A "list" may be any collection of requests, offers, or predictive assessments, and need not be ordered or stored entirely in one place. The system "generates" aggregated predictions by executing an algorithm or performing a calculation or set of calculations according to the rules of a prediction aggregation mechanism.

In another variation of the invention, the server itself does not facilitate the consummation of a transaction between the consumer and a seller, but the consumer and the seller may independently contact one another to arrange a transaction. In still other variations, the server may restrict users from taking some of the actions above. For example, the server might require a fee before users can take these actions, or allow participation only by users preselected to take particular actions. The server may allow all users to view and/or search lists of requests, offers corresponding to each request, and predictive assessments and aggregated predictions corresponding to each offer, or it may restrict access to information to only some users.

In another variation, the server also might require or permit some further input from users taking these actions. For example, the server might transmit a standard list of questions to any consumers seeking a particular type of good or service, and response to such questions could be required, recommended, or merely optional. Such questions might be useful to assist a consumer in formulating a request that clearly expresses his or her needs.

The following example may help to illustrate the invention. A user connects to the server by use of a web browser on the user's computer. After the user logs in to authenticate his/her identity, the user selects an option to make a request. The user then types in an explanation of the request: "I would like to buy a camcorder, in the $300-$400 range, that will perform well in low light conditions, and have at least three hours of battery life." This request is added to the list of requests.

Some time later, another user, whom we will call Seller 1, similarly connects to the server computer, and after authentication, finds the request on the list of requests, and selects an option to make a corresponding offer. Specifically, Seller 1 offers to sell a Sony DCR-VX2100 3 CCD camcorder, with various specified accessories, for $500, including shipping. Later, another seller, Seller 2, connects and makes a different offer, to sell a Canon ZR700 Digital Camcorder for $300, including shipping.

Later, Rater 1 connects to the web site and reads the request and the corresponding offers. Rater 1 selects an option to rate one or more of the offers. Rater 1 gives the offer from Seller 1 a predictive assessment of 3, because the price is outside the range requested by the consumer, and gives the offer from Seller 2 a predictive assessment of 6.

The system's prediction aggregation mechanism produces aggregated predictions from these initial predictive assessments, and, let us suppose, assigns an aggregated prediction of 3.5 to the offer from Seller 1 and an aggregated prediction of 6.5 to the offer from Seller 2, in part because Rater 1 has historically given ratings that are too low.

Still later, Rater 2 logs in and reads the request, offers, and predictive assessments. Rater 2 issues a new predictive assessment for the offer from Seller 1, entering a predictive assessment of 5, because the product offered is an unusually good deal and might be appealing even to someone who initially planned to spend less money. The prediction aggregation mechanism is executed to take account of this new predictive assessment, and it adjusts the aggregated prediction for Seller 1 to 4.3.

Finally, at some point the consumer who initially posted the request connects again to the server. The consumer is given a list of all offers, including the offers from Seller 1 and Seller 2. Suppose the consumer decides to purchase the product from Seller 1. The system facilitates a financial transaction between the consumer and Seller 1, for example, by accepting the input of credit card information or using a third-party financial transaction service such as PayPal, and charges a fee to Seller 1.

Weeks later, when the consumer logs onto the system again, the consumer selects an option to record his satisfaction with the transaction, recording satisfaction as a 5. The prediction aggregation mechanism then calculates rewards or penalties to be imposed on Rater 1 and Rater 2, based on the accuracy of their predictive assessments. For example, it might calculate that Rater 2 should receive a $0.50 reward for improving the aggregated prediction. That money might then be added to an account maintained on Rater 2's behalf.

In a variation, perhaps available as an option for the consumer, the server automatically makes purchases on behalf of the consumer, consummating a financial transaction based on data previously input by the consumer and without any further intervention by the consumer. The server might be programmed so that it will automatically accept an offer on a consumer's behalf whenever the prediction aggregation mechanism forecasts that the consumer will have higher satisfaction with this purchase than with all other alternatives. Alternatively, it might accept an offer only when one possibility is predicted to lead to substantially higher satisfaction.

The server might be programmed to execute the transaction immediately once the condition is met, or only after the condition continues to be met for some set period of time. The latter approach might be useful if the prediction aggregation mechanism produces aggregated predictions that change rapidly over time, as could be the case if the prediction aggregation mechanism is a prediction market.

Figure 5:
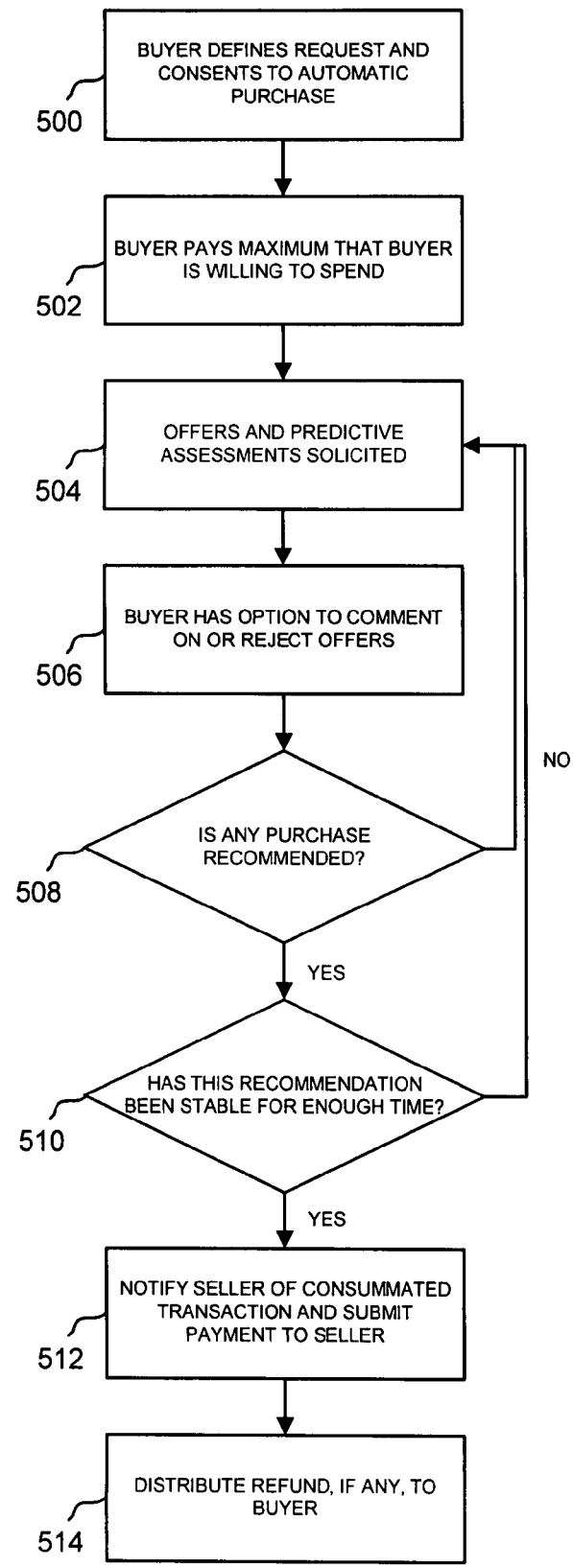
FIG. 5 provides a flow diagram illustrating how a server computer might effect a transaction automatically for a buyer.

FIG. 5 provides a flow diagram illustrating one embodiment of the automatic purchase feature. After a buyer defines a request and consents to use of the automatic purchase feature, in step 500, the buyer deposits the maximum amount that the buyer is willing to spend, in step 502. Offers and predictive assessments are solicited in step 504, and the buyer retains the option of commenting on or rejecting any offers in step 506.

Because a buyer's comments will tend to be predictive of the buyer's ultimate satisfaction, predictors will have incentives to take them into account. If at any time a purchase has been recommended (step 508), and that recommendation is stable for at least a set period of time (step 510), then the transaction is consummated in step 512. If the cost of the transaction is less than the amount deposited, a refund is submitted to the buyer in step 514.

In one variation, a buyer can specify a "multiple purchase" option, in which case the acceptance of one offer does not automatically lead to rejection of the other offers. For example, a buyer may be interested in assembling a wardrobe. The buyer would indicate in defining the request what is already in the wardrobe, and other information relevant to sellers who might have other items to sell.

Figure 6:
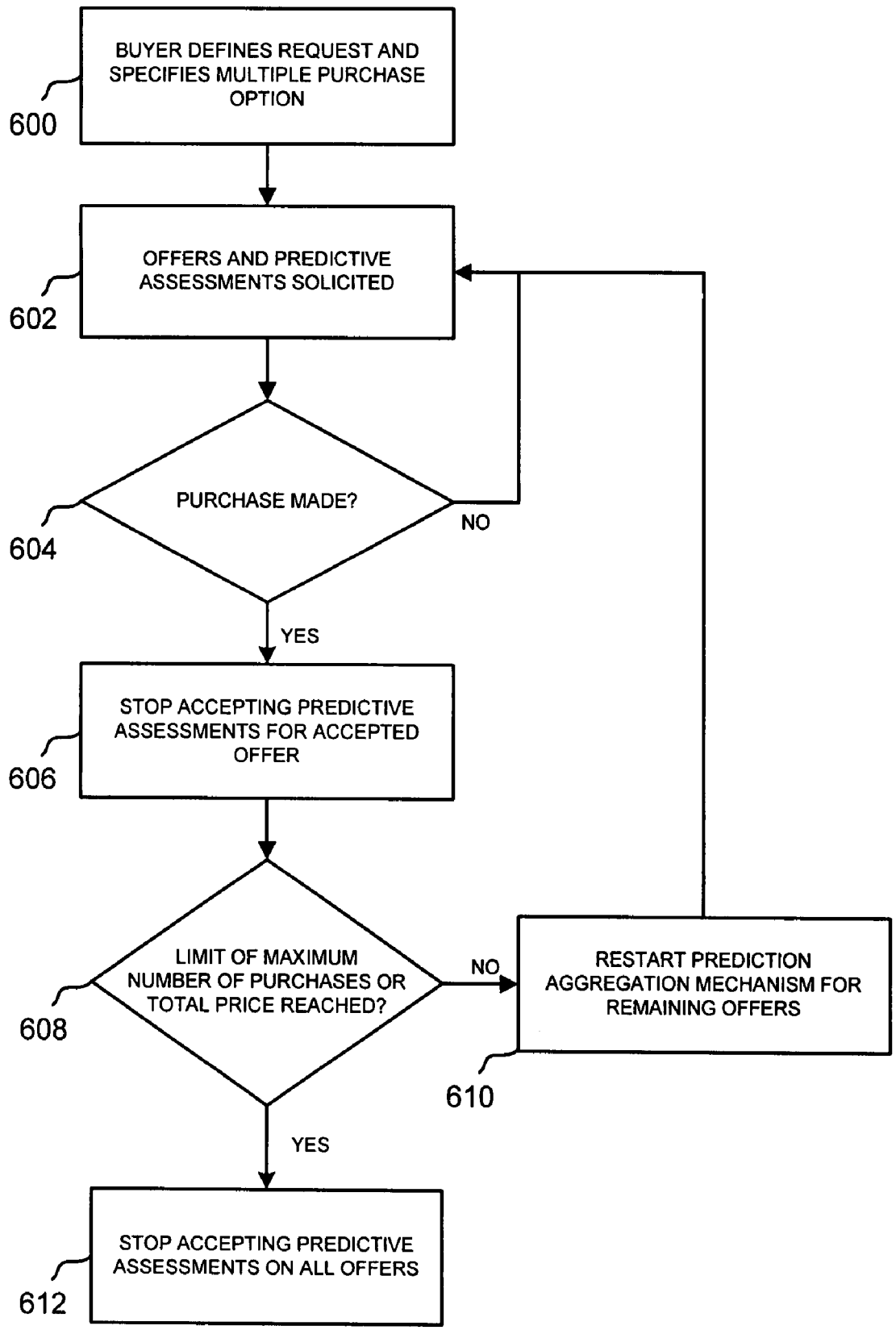
FIG. 6 provides a flow diagram illustrating how a server computer might facilitate multiple purchases for a buyer based on a single request.

FIG. 6 provides an exemplary flow diagram illustrating an embodiment that allows the multiple purchase option. The buyer specifies the multiple purchase option when defining a request, in step 600. Offers and predictive assessments are solicited, in step 602, until a purchase is made, in step 604. No more predictive assessments are then accepted for the accepted offer (step 606).

If the total number of purchases or a total price threshold optionally set by the user is reached, in step 608, then all predictive aggregation mechanisms for the offers are stopped in step 610. Otherwise, the prediction aggregation mechanisms for remaining offers are restarted in step 612. Predictors might well enter different predictive assessments as a result of an accepted offer, either because the acceptance of the offer provides information about the buyer's tastes, or because other offers may be complements for or substitutes of the accepted offer.

C. Prediction Aggregation Mechanisms

One aspect of various embodiments of the invention is the use of a prediction aggregation mechanism. It is noted in passing that a variation uses a scoring rule instead of a prediction aggregation mechanism, but only when a plurality of sellers are permitted to view the request and to make offers.

A "prediction aggregation mechanism" is defined as a mechanism including an algorithm for producing an aggregated prediction or aggregated predictions on the basis of the predictive assessments of one or more predictors. Although an aggregated prediction or aggregated predictions may be determined solely through the predictive assessment of a single predictor, if only a single predictor chooses to make a predictive assessment, a plurality of potential predictors, preferably not all under the economic ownership of a single individual or entity, must be given an opportunity to make predictive assessments.

Each of the predictors may gain or lose money or points based on the accuracy of their predictive assessments, as determined by the algorithm specified by the prediction aggregation mechanism. It is preferable that the algorithm meets the condition that the amount of money or points that a predictor gains or loses will sometimes depend at least in part on the predictive assessments of other predictors who have earlier or are simultaneously making predictive assessments.

"Money" is defined to include cash, securities, coupons, lottery tickets, discounts, credits, purchase rights, ownership rights, and the like. "Points" includes any measurement of the success of a participant, regardless of whether the point units can be exchanged for money or prizes or make the participant eligible for money or prizes. Some of the illustrative embodiments below are described using the word "money," but identical illustrations could be constructed using "points." It is noted that "money" and "points" can be generalized as meaning compensation of some sort and, as mentioned previously, can be involve negative quantities.

A "predictive assessment" is an action chosen by a user on one or more client computers that constitutes or implies a forecast concerning a variable being predicted by the prediction aggregation mechanism. For example, a statement of a point estimate of a consumer's eventual satisfaction, should the consumer eventually accept a particular offer, would constitute a predictive assessment. Similarly, an expression of a probability distribution of a consumer's eventual satisfaction would constitute a predictive assessment. Finally, the action of purchasing or selling tradable contracts in a prediction market, which will be described shortly, would constitute a predictive assessment.

In addition, a statement that the consumer's satisfaction will be greater than (or less than) the current value of an aggregated prediction, or greater than (or less than) some other value, already determined or to be determined later, would constitute a predictive assessment.

A predictive assessment may also occur in qualitative form. For example, a predictor may simply indicate that "consumer satisfaction will be high", as long as the prediction aggregation mechanism includes some algorithm for converting such qualitative statements into quantitative entities, such as point estimates or probability distributions.

Moreover, any action from which a forecast can be implied constitutes a predictive assessment. Thus, purchase of a contract that will pay off a positive amount of money if and only if the consumer's eventual satisfaction is greater than the current value of an aggregated prediction would constitute a predictive assessment.

It may be, of course, that a predictor is in reality taking an action or making a forecast for some other reason, for example, to diversify the predictor's portfolio or in an attempt to manipulate the prediction aggregation mechanism into producing an inaccurate forecast. Nonetheless, as long as an action would appear to imply a forecast given the assumptions that the predictor is rationally trying to increase his or her expected wealth and that the predictor is not trying to manipulate the prediction aggregation mechanism, the action will constitute a predictive assessment.

Like a "predictive assessment," an "aggregated prediction" may come in various forms. For example, an "aggregated prediction" may be a point estimate of the consumer's ultimate satisfaction, or an estimate of the probability that the consumer's satisfaction will fall between specified levels. It could also be a probability distribution. An "aggregated prediction" might also be presented in qualitative form. For example, the "aggregated prediction" might be that the consumer will be "not satisfied," "somewhat satisfied," or "very satisfied," provided that the prediction aggregation mechanism includes some means for converting quantitative evaluations into qualitative entities.

An exemplarily significant qualification in the definition of prediction aggregation mechanism is that predictors "may gain or lose money or points based on the accuracy of their predictive assessments, as determined by the algorithm specified by the prediction aggregation mechanism."

Thus, consider, for example, a retail salesperson who tells a customer that an outfit "would be a great buy that you will be very happy with." It may be that if the salesperson turns out to be wrong, the customer will complain and the salesperson could lose his or her job, thus satisfying the first part of the qualification, "los[ing] money or points based on the accuracy of their predictive assessments."

However, the amount of money that the salesperson gains or loses as a result of the forecast is not determined by an algorithm specified by the prediction aggregation mechanism. It is also not a prediction aggregation mechanism for other reasons, since there would not be the potential for multiple predictors, where the forecasts of the early predictors may affect the amount gained or lost by later predictors. Moreover, it is noted that the statement of the retail person is not entered into a client computer.

Collaborative filtering algorithms mentioned earlier also will generally not constitute prediction aggregation mechanisms within the meaning of the present invention. It might be arguably true that an algorithm such as the one that Netflix.com uses to recommend movies to a viewer forecasts the consumer's satisfaction with a particular offer, should the consumer accept that offer. However, there is no predictor who stands to gain or lose money or points as a result of the predictive assessment that is being made, as determined by an algorithm.

Moreover, at most only a single predictor (e.g., the computer-based agent that runs the collaborative filtering algorithm) makes a particular prediction. That is, even if Netflix.com occasionally used different collaborative filtering algorithms, and even if Netflix.com created computerized agents to run these different collaborative filtering algorithms and report predictions, and even if Netflix.com scored these different algorithms based on their performance, all of those predictors would be under the economic control of the same company.

Suppose, by contrast, that a company allowed a plurality of other entities to use their own client computers to make predictive assessments for particular consumers of consumer satisfaction with products based on information provided by the company or to submit computer programs that would in turn make such predictive assessments, and that the company then compensated those other entities based on their actual success in forecasting customer satisfaction based on actual requests from consumers according to some formula and the consumers' actual reports of satisfaction. Suppose also that the amount of money a particular company received for a particular request depended in part on the performance of its forecast relative to the performance of the previous or simultaneous predictive assessments of other companies. Such combination then would constitute a prediction aggregation mechanism. Whether this combination would amount to the invention as a whole would, of course, depend on whether the practice comprised other aspects of the invention.

A prediction aggregation mechanism is also to be distinguished from a scoring rule, as discussed in Allan H. Murphy and Robert L. Winkler, "Scoring Rules in Probability Assessment and Evaluation," Acta Psychologica, 34: 273-286 (1968). A scoring rule is simply a function providing a reward for a predictor, where increased accuracy may lead to higher rewards.

For example, a predictor of a number between 1 and 10 might be promised a payment of $0.10 less one penny for each unit of deviation from the actual number. So, if the predictor announced a predictive assessment of 5 and the actual number turned out to be 7, the predictor would receive $0.08. Similarly, multiple predictors may be compensated according to one or more scoring rules, where no scoring rule's specification depends on the predictive assessments made by other predictors. The predictive assessments could then be aggregated according to a mathematical function or other algorithm. For example, an aggregated prediction might report the mean and the median as aggregated predictions.

Nonetheless, this combination would not be a prediction aggregation mechanism, because the gains or losses of the predictors are entirely independent of one another. Some variations of the present invention do use a scoring rule rather than a prediction aggregation mechanism.

Various examples of a prediction aggregation mechanism will now be described. Others would be familiar to someone with ordinary skill in the art, after taking the present invention as a whole. Each of these prediction aggregation mechanisms can be used to generate one or more forecasts of a variable of interest, such as the satisfaction of a consumer if the consumer makes a particular purchase. The general function of some prediction aggregation mechanisms will be described, followed by a brief discussion of how they might be applied to the invention at hand.

1. Market Scoring Rules

An alternative to rewarding each predictor according to a separate scoring rule is to use the "market scoring rule" in conjunction with a single scoring rule, as disclosed in Robin Hanson, "Combinatorial information market design," Information Systems Frontiers, 5(1), 207, 2003. Under the market scoring rule, the aggregated prediction is the most recent announcement by a predictor of a predictive assessment. Each predictor receives the difference between the amount indicated by applying the scoring rule to the aggregated prediction after the predictor's announcement and applying the scoring rule to the aggregated prediction before the predictor's announcement.

Assume that there are n predictors announcing predictive assessments $p_1$ to $p_n$, and that the scoring rule function is $f(p)$. Then, the amount of money that predictor i receives is $f(p_i)-f(p_{i-1})$. An initial default predictive assessment $p_0$ may be announced to help determine what the first predictor receives.

In effect, each predictor after the first compensates the previous predictor based on the announced scoring rule, and then receives compensation from the next predictor or, in the case of the last predictor, the market sponsor, according to the same scoring rule. Those who improve on the previous aggregated prediction, as measured by the scoring rule, will make money, while those who make a less accurate prediction than the previous aggregated prediction will lose money. Note that the market scoring rule qualifies as a prediction aggregation mechanism in part because the payoff for a predictor will depend in part on the accuracy of the immediately preceding predictive assessment.

Figure 7:
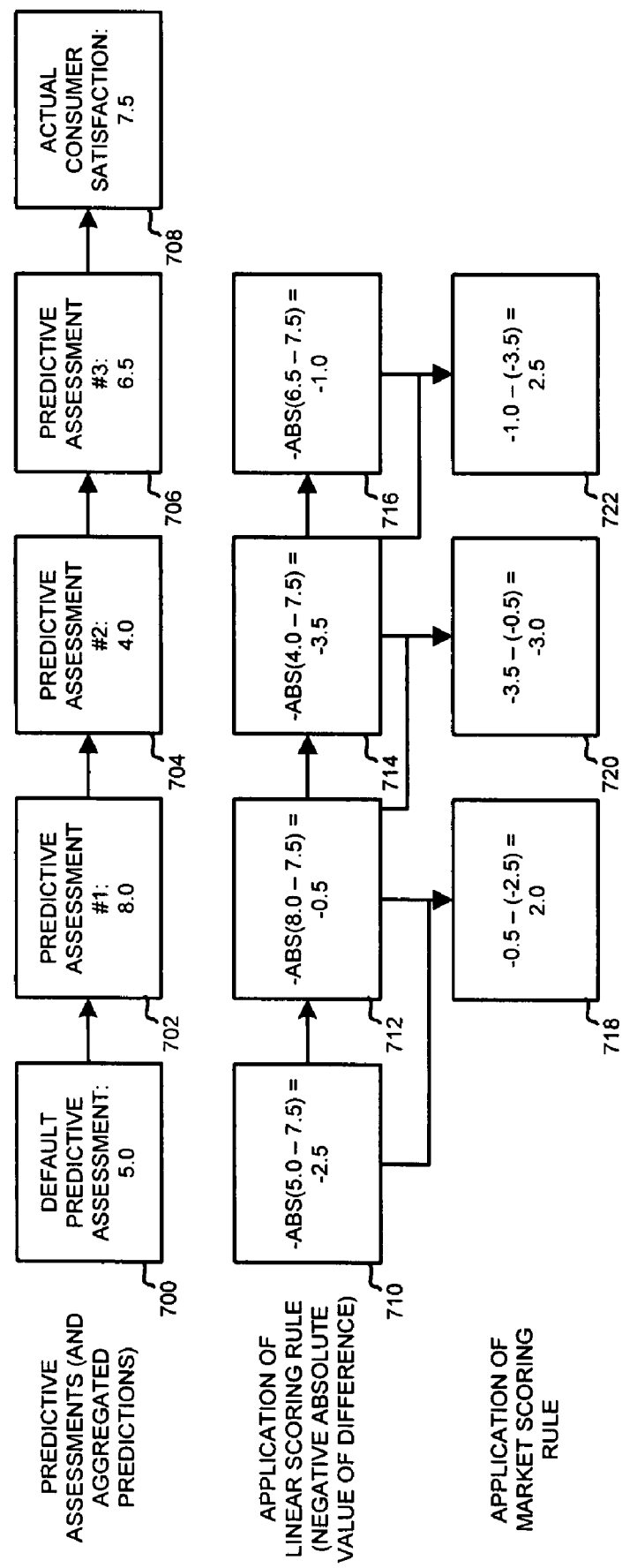
FIG. 7 illustrates the operation of a market scoring rule used as a prediction aggregation mechanism in one exemplary embodiment.

FIG. 7 provides an illustration of an exemplary embodiment based on the market scoring rule. In this illustration, the underlying scoring rule is a simple linear scoring rule, equal to the negative of the absolute value of the difference between the predictive assessment and the ultimate value. More accurate predictive assessments thus produce less negative scores.

At any time, an aggregated prediction for the market is equal to the most recent predictive assessment 702, 704, and 706, or, before a predictive assessment is made, to the default predictive assessment 700. The linear scoring rule is applied to each of these predictive assessments 710, 712, 714, and 716. The market scoring rule is then applied to produce a score for each predictive assessment 718, 720, and 722, by subtracting the number produced by the linear scoring rule for the previous predictive assessment or default prediction from the number produced by the linear scoring rule for the predictive assessment being scored.

Note that the predictors who move the aggregated predictions closer to the eventual realized consumer satisfaction earn positive scores (e.g., 718 and 722), while the predictor who moves the aggregated prediction in the wrong direction earns a negative score (e.g., 720). These scores could easily be translated through some other function into money or points or other form of compensation measure.

2. Prediction Markets

A prediction market is an exchange permitting the buying and selling of contracts that will pay off according to the outcome of some future event, such as a consumer's announcement of satisfaction. Tradesports.com and the Iowa Electronic Markets provide examples of prediction markets in which payoffs depend on events such as sporting contest and election outcomes. On Tradesports.com and the Iowa Electronic Markets, predictors buy and sell shares from one another, not from the market sponsor.

An economic literature has examined the success of prediction markets in comparison with alternatives, such as polls, and has generally found prediction markets to be a relatively accurate prediction aggregation mechanism. Justin Wolfers and Eric Zitzewitz, "Prediction Markets," Journal of Economic Perspectives, 18: 107, 2004. Note that in a prediction market, a predictor need not explicitly announce a forecast. The "predictive assessments" may, for example, be considered to be posted offers to buy or sell tradable contracts, or actual sales or purchases of contracts, rather than explicit predictions.

In a prediction market in which predictors buy and sell shares to and from one another, an aggregated prediction could be based on the most recent price at which a contract was traded. For example, suppose that a contract is defined so that it will pay off $0.10 for each point of satisfaction announced by a consumer. Then, if the most recent transaction were a sale of a contract from one party to another at $0.50, then the aggregated prediction might be that the consumer will announce a satisfaction of 5. An alternative or additional aggregated prediction could be the midpoint of the current bid and ask prices, where the bid price is the most that someone is offering to pay for a tradable contract and the ask price is the most that someone is offering to sell a tradable contract.

Figure 8:
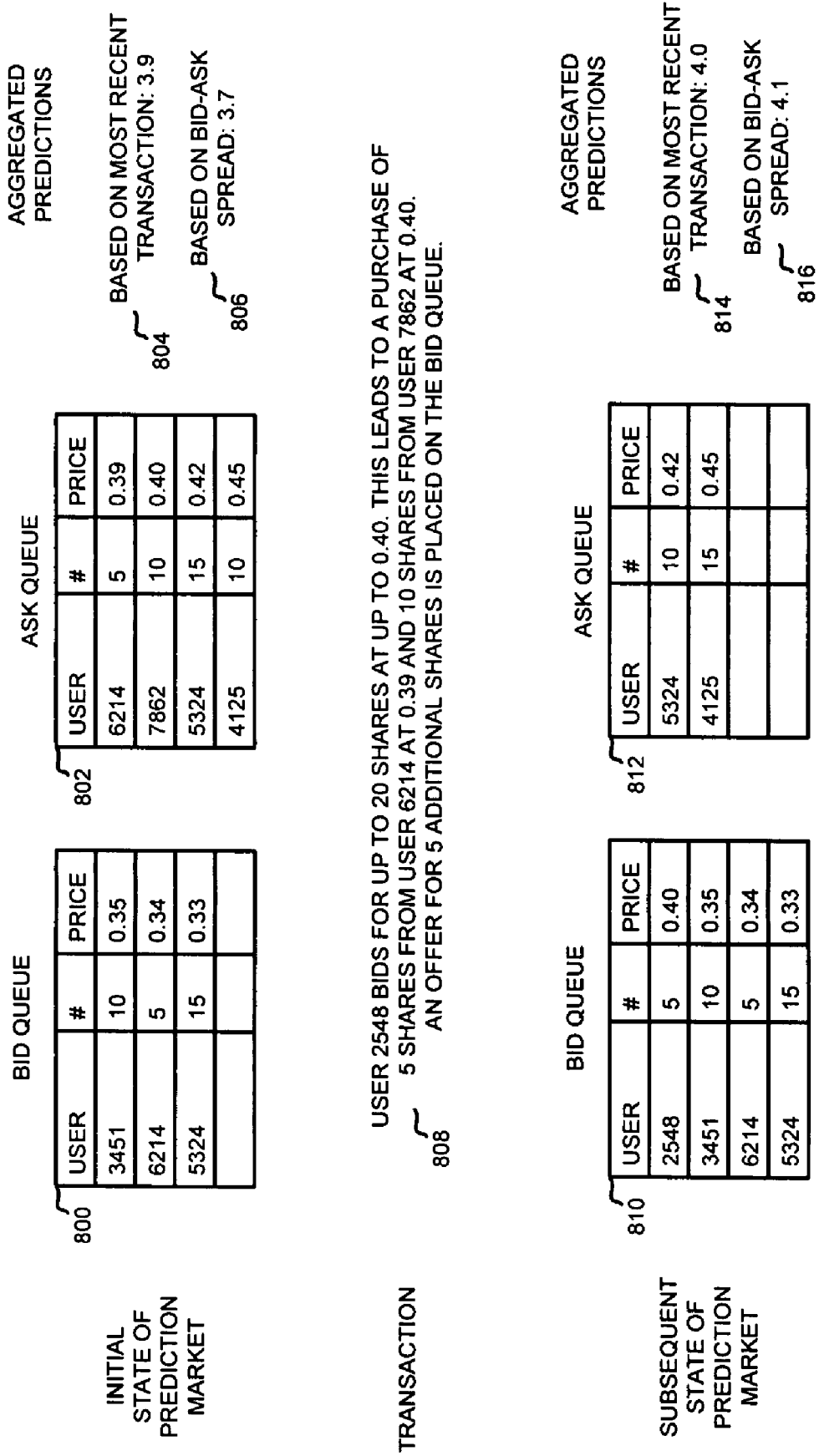
FIG. 8 exemplarily illustrates the operation of bid and ask queues in a prediction market.

FIG. 8 illustrates the effect of an action by a predictor in a prediction market. A "bid queue" 800 of offers to purchase the contract and an "ask queue" 802 of offers to sell the contract are maintained. The most attractive offers are at the top of each queue, with less attractive (or as a tie-breaker, later) offers further down on each queue.

In this illustration exemplarily shown in FIG. 8, the most recent purchase of a contract occurred at 0.39, and so the aggregated prediction based on the most recent transaction 804 is 3.9. Because the midpoint of the bid-ask spread is 0.37, the aggregated prediction based on the bid-ask spread 806 is 3.7. In a hypothetical transaction 808, a user bids for up to 20 shares at up to 0.40. This leads to a purchase of a total of 15 shares from two users at the prices posted at the top of the ask queue.

These offers are then cleared from the ask queue 812. The user's remaining bid for five additional shares then becomes the most attractive of the offers on the bid queue 810. The transaction price least attractive for the user initiating the transaction then is translated into the aggregated prediction based on the most recent transaction 814, and the aggregated prediction based on the bid-ask spread changes as well 816.

A prediction market can serve as a prediction aggregation mechanism whether or not there is an "automated market maker." An automated market maker is a computer-based agent that can make offers or agree to offers to buy and sell securities, either as an alternative to or as a complement to trading among participants. Such an automated market maker can provide additional liquidity to a prediction market.

Any version of the market scoring rule can be shown to be equivalent to an automated market maker that posts "bid" and "ask" offers to purchase or sell tradable contracts at particular prices. Robin Hanson, "Combinatorial information market design", Information Systems Frontiers, 5(1), 2003, describes specifically how a market scoring rule can be implemented for a prediction market in which the solicited predictive assessment is of the probability of the occurrence of one or more events, and details the implementation of the market scoring rule in accordance with a logarithmic scoring rule. The logarithmic scoring rule is described originally in Robert L. Winkler and Allan H. Murphy, "Good probability assessors", Journal of Applied Meteorology, 7: 751-758, 1968.

This approach can be extended easily to make aggregated predictions that are point estimates, not just forecasts of probabilities. For example, a prediction market under some instantiation of the market scoring rule could be used to forecast the probability that a consumer's announced satisfaction will be between 1 and 2, or that it will be between 3 and 4, etc., and the aggregated prediction could then be a function of the various probabilities (for example, a probability-weighted average of the midpoint of each range). It is also possible to use an automated market maker to forecast a point estimate directly without forecasting any probabilities, for example by basing the market scoring rule on a linear scoring rule.

An automated market maker may make it possible for predictive assessments to be aggregated even in the absence of any transactions between different predictors. An exemplary embodiment uses an automated market maker that is equivalent to the market scoring rule based on a quadratic scoring rule. In this embodiment, for each predictive assessment being made, there are two types of contracts that predictors may purchase.

The "high" contracts will pay off some maximum amount, v, if and only if the event being predicted in fact occurs at the maximum possible value, $p_{max}$. For example, $p_{max}$ might be set to equal the maximum possible transaction satisfaction score that a consumer is permitted to report. If predicting a binary event, such as whether the consumer is satisfied or not, $p_{max}$ might be set to 1. The "low" contracts will pay off v if and only if the event being predicted occurs at the minimum possible value, $p_{min}$ (ordinarily set to 0 if predicting a binary event).

When and if the event being predicted occurs, the "high" and "low" contracts pay off proportionately. So, for example, if $p_{min}=0$ and $p_{max}=10$, and the consumer eventually reports a transaction satisfaction of 4, then the "high" contracts would pay off 0.4*v and the "low" contracts would pay off 0.6*v.

At any given time in this exemplary embodiment, there is a single current aggregated prediction, $p_{current}$. This preferably is set to some default value before any predictors have entered predictive assessments. At all times, $p_{current*}=(p_{current}-p_{min})/(p_{max}-p_{min})$. The automated market maker is available to sell "high" contracts for all prices above $p_{current*}$ * v, and to sell "low" contracts for all prices above $(1-p_{current*})$*v.

As a predictor purchases an infinitesimal portion of a contract, the price rises. The total number of shares that a predictor can purchase for a given amount of money depends on a density variable d, which equals s*2/v, where s represents the maximum amount of possible subsidy if the market were to move all the way from the minimum value at the start of the market, where the default is set at that value, to the maximum value, or vice versa.

More specifically, suppose the predictor in this embodiment wishes to change the price to $p_{new}$, subject to the constraints that $p_{new} \geq p_{min}$, $p_{new} \leq p_{max}$, and $p_{new} \neq p_{current}$. Let $p_{new*} = (p_{new} - p_{min})/(p_{max} - p_{min})$. If $p_{new} > p_{current}$, then the cost $c = (p_{new*}^2 - p_{current*}^2) * s$. The predictor receives $d*(p_{new*} - p_{current*})$ "high" shares, and the user is charged c. Then, $p_{current}$ becomes equal to $p_{new}$. If $p_{new} < p_{current}$, $c = ((1-p_{current*})^2 - (1-p_{new*})^2) * s$. The predictor receives $d*(p_{current*} - p_{new*})$ "low" shares, and the predictor is charged c. Then, $p_{current}$ becomes equal to $p_{new}$.

Suppose now that the predictor in this embodiment wishes to increase the price for a cost of c, where the predictor has entered the c instead of a predictive assessment. If the predictor wishes to raise the aggregated prediction, then $p_{new*} = \text{sqrt}(p_{current*}^2 + (c/s))$. It is required that $p_{new*} \leq 1$, otherwise the transaction must be rejected (or reprocessed using above algorithm where user is effectively setting $p_{new} = p_{max}$ and c is calculated). Assuming the transaction is permissible, $p_{new} = p_{min} + p_{new*} * (p_{max} - p_{min})$. The predictor receives $d*(p_{new*} - p_{current*})$ "yes" shares. If the predictor wishes to lower the aggregated prediction, then $p_{new*} = 1 - \text{sqrt}((1-p_{current*})^2 + (c/s))$. It must be confirmed that $p_{new*} \geq 0$, otherwise the transaction must be rejected (or reprocessed using above algorithm where user is effectively setting $p_{new} = p_{min}$ and c is calculated). If valid, $p_{new} = p_{min} + p_{new*} * (p_{max} - p_{min})$. The predictor receives $d*(p_{current*} - p_{new*})$ "no" shares. Table 1 summarizes various formulas that may be used to implement the prediction aggregation mechanism in the preferred embodiment.

TABLE 1

Formulas for Implementing the Prediction Aggregation Mechanism in the Preferred Embodiment

| | Initial state variables | |
|---|---|---|
| $p_{min}$ | The minimum possible outcome | Given |
| $p_{max}$ | The maximum possible outcome | Given |
| s | The maximum possible subsidy | Given |
| v | The maximum possible payoff of a share | Given |
| $p_{default}$ | The default prediction | Given |
| $p_{current}$ | The current prediction | At beginning of market: $p_{default}$. After new prediction is processed: $p_{new}$ |
| d | The density, or the total number of shares that a forecaster would need to purchase to move the prediction from $p_{min}$ to $p_{max}$ | 2s/v |
| $p_{current*}$ | The scaled current prediction | $(p_{current} - p_{min})/(p_{max} - p_{min})$ |
| | Variables realized after occurrence or event | |
| $p_{final}$ | The final result of the event (for a binary event, 0 if the event does not occur and 1 if it does occur) | Determined by the ultimate event, or by the market sponsor as a result of the early termination of the market |
| $p_{final*}$ | The scaled final result | $(p_{final} - p_{min})/(p_{max} - p_{min})$ |
| | If predictor wishes to set a new predication higher than the current prediction | |
| $p_{new}$ | The new prediction; must confirm that $p_{min} \leq p_{new*} \leq p_{max}$. | Given by predictor |
| $p_{new*}$ | The scaled new prediction | $(p_{new} - p_{min})/(p_{max} - p_{min})$ |
| c | The cost to the predictor (or, equivalently, the maximum loss that the predictor faces) | $s(p_{new*}^2 - p_{current*}^2)$ |
| q | The number of "high" shares received by the predictor | $(2s/v) * (p_{new*} - p_{current*})$ |
| w | The predictor's gross winnings, i.e. the payoff that the predictor receives after occurrence of the event | $2s * p_{final*} * (p_{new*} - p_{current*})$. |
| π | The predictor's net winnings or profit | w − c |
| | If predictor wishes to set a new predication lower than the current prediction | |
| $p_{new}$ | The new prediction; must confirm that $p_{min} \leq p_{new*} \leq p_{max}$. | Given by predictor |
| $p_{new*}$ | The scaled new prediction | $(p_{new} - p_{min})/(p_{max} - p_{min})$ |
| c | The cost to the predictor (or, equivalently, the maximum loss that the predictor faces) | $s((1 - p_{new*})^2 - (1 - p_{current*})^2)$ |
| q | The number of "low" shares received by the predictor | $(2s/v) * (p_{current*} - p_{new*})$ |
| w | The predictor's gross winnings, i.e. the payoff that the predictor receives after occurrence of the event | $2s * (1 - p_{final*}) * (p_{current*} - p_{new*})$. |
| π | The predictor's net winnings or profit | w − c |
| | If predictor wishes to purchase "high" shares for a given cost | |
| c | The cost to the predictor (or, equivalently, the maximum loss that the predictor faces) | Given by predictor |
| $p_{new*}$ | The scaled new prediction; must confirm that $p_{min} \leq p_{new*} \leq p_{max}$. | $\text{sqrt}(p_{current*}^2 + (c/s))$ |
| $p_{new}$ | The new prediction (from which other variables can be calculated, as above) | $p_{min} + p_{new*} * (p_{max} - p_{min})$ |
| | If predictor wishes to purchase "low" shares for a given cost | |
| c | The cost to the predictor (or, equivalently, the maximum loss that the predictor faces) | Given by the predictor |
| $p_{new*}$ | The scaled new prediction; must confirm that $p_{min} \leq p_{new*} \leq p_{max}$. | $1 - \text{sqrt}((1 - p_{current*})^2 + (c/s))$ |
| $p_{new}$ | The new prediction (from which other variables can be calculated, as above) | $p_{min} + p_{new*} * (p_{max} - p_{min})$ |

TABLE 1-continued

Formulas for Implementing the Prediction Aggregation Mechanism in the Preferred Embodiment

| | | If predictor wishes to purchase a particular number of "high" shares | |
|---|---|---|---|
| q | The number of "high" shares purchased by the predictor | | Given by predictor |
| $p_{new*}$ | The scaled new prediction; must confirm that $p_{min} <= p_{new*} <= p_{max}$. | | $p_{current*} + q/d$ |
| $p_{new}$ | The new prediction (from which other variables can be calculated, as above) | | $p_{min} + p_{new*} * (p_{max} - p_{min})$ |
| | | If predictor wishes to purchase a particular number of "low" shares | |
| q | The number of "low" shares purchased by the predictor | | Given by the predictor |
| $p_{new*}$ | The scaled new prediction; must confirm that $p_{min} <= p_{new*} <= p_{max}$. | | $p_{current*} - q/d$ |
| $p_{new}$ | The new prediction (from which other variables can be calculated, as above) | | $p_{min} + p_{new*} * (p_{max} - p_{min})$ |

In this embodiment, after a transaction, if the user holds at least z "high" and z "low" shares in the same market, then these z "high" and z "low" shares are immediately redeemed for a combined total of z*v. This ensures that a user who in immediate succession changes an aggregated prediction by issuing a predictive assessment and then changes it back by issuing as a predictive assessment the original aggregated prediction will be left exactly back where the user started. In some embodiments, users may be charged some additional small per-transaction fee to discourage users from placing excessive strain on the server computers.

An advantage of this embodiment over many other automated market makers is that the amount of expected profit from making a given percentage correction in market price is constant across the spectrum from $p_{min}$ to $p_{max}$. The amount of profit that can be made from a given correction depends on the available market liquidity, and this embodiment provides liquidity that is constant across the spectrum.

With the logarithmic market scoring rule, by contrast, the expected profit will vary across the probability spectrum. For many applications, the amount of liquidity should be roughly equal across the spectrum. It may be just as important to encourage predictors to conduct research that will lead them to change a predictive assessment of consumer satisfaction on a 1 to 10 scale from 2 to 3 as it would be to encourage research leading to a change from 8 to 9.

This embodiment can be modified, however, to allow differing densities for different parts of the market. Because users are unlikely to select offers where their expected degree of satisfaction will be low, it may make sense to offer greater subsidies for relatively high expected degrees of satisfaction. This incentive structure will lead predictors to spend more time seeking to identify marginal predictive inaccuracies among predictions corresponding to relatively high expected degrees of satisfaction than among predictions corresponding to relatively low degrees of satisfaction.

Given a function representing the subsidy weight for a marginal change to a given prediction, it is straightforward to modify the above formulas. It is also straightforward to allow modification of the subsidy over time. For example, it may be desirable to offer a very low subsidy early in the market, so that predictors do not receive excessive rewards for easy corrections to the default predictive assessment or other predictive assessments.

Let f(x) be a function representing the subsidy weight for a marginal change to a given prediction p, defined over the range of all possible predictions, and let F(p) represent a cumulative density function for f(p). Let $f_{mean}(a,b)$ equal the average value of f(p) from a to b, i.e. (F(b)−F(a))/(b−a). Meanwhile, let g(t) represent the subsidy weight at time t, where $0 <= g(t) <= 1$ for all t.

Let us now represent the maximum possible subsidy by the variable σ, and let the variable s now represent an adjusted subsidy variable that can be substituted for s in all of the above formulas. The formula for s is $\sigma * g(t) * f_{mean}(p_{current}, p_{new}) / f_{mean}(p_{min}, p_{max})$. These definitions and relevant formulas are summarized in Table 2 below.

TABLE 2

Formulas for Implementing Subsidies That Vary Over Time and/or the Prediction Spectrum New variables and the calculation of the adjusted subsidy measure

| | | |
|---|---|---|
| f(p) | The subsidy weight for a marginal change to a given prediction p | Given for all p between $p_{min}$ and $p_{max}$, where $0 <= f(p)$ for all p. |
| F(p) | The cumulative density function for f(p) | Can be calculated from f(p). Note that $F(p_{min}) = 0$, and where $p_{min} + \epsilon <= p <= p_{max}$, $F(p) \approx F(p - \epsilon) + \epsilon f(p)$. |
| $f_{mean}(a, b)$ | The average value of f(p) from a to b | $(F(b) - F(a))/(b - a)$ |
| g(t) | The subsidy weight at time t, where $0 <= g(t) <= 1$ for all t. | Given |
| t | The time at which the current transaction takes place | Given |
| σ | The maximum possible subsidy | Given |
| s | Adjusted subsidy variable | $\sigma * g(t) * f_{mean}(p_{current}, p_{new}) / f_{mean}(p_{min}, p_{max})$ |

3. Other Prediction Aggregation Mechanisms

Numerous other prediction aggregation mechanisms would be known to someone having ordinary skill in the art. In a pari-mutuel betting market, a predictor can purchase, for a fixed fee, a right to bet on one of various possible outcomes. Those who predict correctly share all money wagered (e.g., after any portion is deducted by the market sponsor, and possibly after the money for the winning tickets is first refunded).

For example, predictors might be permitted to wager on each of various ranges of consumer satisfaction outcomes, and an aggregated prediction of the consumer's satisfaction would be a function of the wagers placed. Similarly, U.S. Patent Application Publication No. US 20050171878 to Pennock discloses a "dynamic pari-mutuel market," in which the price of a wager on a particular outcomes rises or falls based on the wagers already placed, so that it is cheaper to bet on an outcome seen by previous bettors as unlikely. In a pari-mutuel or dynamic pari-mutuel market, the placement of wagers on one or more outcome constitutes the "predictive assessment" in the prediction aggregation mechanism of the present invention.

In most of the examples of prediction aggregation mechanisms given above, predictive assessments are given at different times, and the aggregated prediction is updated after each predictive assessment. However, this process is not essential to operation of a prediction aggregation mechanism.

U.S. Pat. No. 5,608,620 to Lundgren discloses a method of eliciting unbiased forecasters from two or more forecasters. Each forecaster's pay is calculated based in part on the individual forecaster's marginal contribution to predictive accuracy. This marginal contribution may be calculated by comparing the inaccuracy of an aggregated prediction calculated including the forecaster's predictive assessment to an aggregated prediction calculated excluding the forecaster's predictive assessment. With the invention disclosed in that patent, the predictive assessments may be made simultaneously, where "simultaneously" is understood to include a situation in which two or more predictors in fact offer their predictive assessments at different times but without knowing of the others' predictive assessments.

An alternative prediction aggregation mechanism, compatible with both seriatim and simultaneous predictive assessments, would calculate aggregated predictions based in part on the predictors' performance in making previous predictive assessments. The stronger the performance of a particular predictor, the greater the weight that this predictive assessment would be given, either relative to other predictive assessments or relative to the current aggregated prediction, in calculating a new aggregated prediction.

In an illustrative embodiment, the server computer would calculate a regression model based on past predictive assessments, where the dependent variable equals the weight that ideally would have been assigned to each previous predictive assessment. Suppose, for example, that on a previous offer corresponding to a consumer request, the system had initially anticipated customer satisfaction of 5, that a predictive assessment of 7 was then entered by a user, and that the actual level of customer satisfaction turned out to be 6. Then, the dependent variable for this observation in the regression would be 0.5, since assigning an equal weight to the previous aggregated prediction of 5 and the new predictive assessment of 7 would have produced a correct forecast. Alternative approaches to specifying this dependent variable would be obvious to a person having ordinary skill in the art, taking the present invention as a whole.

Independent variables might include measures of the number of predictive assessments entered, the number of times a predictor has made a predictive assessment, the weight that would have optimized previous predictive assessments made by that predictor, as well as interactions between these and other variables. Other independent variables that might be included would be obvious to a person having ordinary skill in the art. A predictor also might be given an opportunity to enter a given level of confidence in a predictive assessment, with higher levels of confidence being taken more into account by the prediction aggregation mechanism.

In this illustrative embodiment, a fitted regression model would be used to calculate a forecast based on a predictor's predictive assessment. In one version of this illustrative embodiment, this forecast would become a new "predictive assessment" to which another prediction aggregation mechanism would be applied, and compensation to predictors would be based on this predictive assessment. In effect, this approach would limit the ability of predictors to change the aggregated predictions until they established through experience that their predictive assessments were sufficiently reliable.

In another version, the aggregated prediction would simply be set equal to the forecast determined by the fitted regression model. Payoffs to predictors might be calculated as in any other prediction aggregation mechanism, based on either the original predictive assessment or the forecast. Alternatively, predictors might simply be paid off an amount proportional to the amount by which they succeeded in changing the aggregated prediction. With this approach, accurate predictive assessments do not provide immediate rewards, but enable predictors to earn reputation on which they may capitalize in subsequent iterations of the prediction aggregation mechanism.

In the absence of any predictive assessments, the prediction aggregation mechanism may report simply that no aggregated prediction is available. Alternatively, the prediction aggregation mechanism might provide a default aggregated prediction.

For example, the prediction aggregation mechanism might make a default aggregated prediction based on a regression model, where the dependent variable is consumer satisfaction in previous transactions processed by the system. Independent variables might include consumer satisfaction on offers previously made by the seller and accepted by other users, the consumer satisfaction of the current consumer on previous transactions, and a report by the seller of the level of consumer satisfaction that the seller expects the consumer to announce, as well as other variables that would be obvious to a person having ordinary skill in the art. In this illustrative embodiment and others using regression model, some other system must be used for at least the first few transactions, because no regression can be calculated based on zero observations.

In general, the accuracy of the default aggregated prediction may be relatively high for some forecasts, and relatively low for others. For example, when the consumer and seller have previously engaged in numerous transactions on the system, and when the transaction is for a type of good or service that has been exchanged numerous times through the system, the prediction aggregation mechanism may provide a more reliable forecast than in other circumstances. In some embodiments, the stronger the expected accuracy of the default predictive assessment, the greater the weight that it will receive relative to new predictive assessments that predictors enter.

D. Application of Prediction Aggregation Mechanisms to Consumer Transactions

1. Variables to Forecast

In the present invention, the prediction aggregation mechanism is applied to predict one or more variables representing the consumer's satisfaction. In one exemplary embodiment, the consumer later reports his or her (or its, in the case of an institutional consumer) satisfaction on a numeric scale, for example from 1 to 10, as in the examples above. In another embodiment, the consumer is asked to report a binary satisfaction indicator (satisfied or unsatisfied), or to choose from among several possibilities ("extremely satisfied," "very satisfied," etc.). In yet another exemplary embodiment, the consumer is requested to report his or her gross or net consumer surplus. The gross consumer surplus is the most the consumer would have paid for the good or service, with the information now available to the consumer, and the net consumer surplus equals the gross consumer surplus minus the price paid by the consumer.

The prediction aggregation mechanism also might be used to forecast other variables related to or correlated with transaction satisfaction. The prediction aggregation mechanism might forecast the probability that the consumer will in fact enter into a particular transaction, the probability that the consumer will return the good or service, if permitted to do so, the probability that the consumer would recommend the good or service or the provider thereof to other consumers, the probability that the consumer would use the system once again for similar or for unrelated purchases, the amount of money the consumer would spend on future purchases, the amount of money that a consumer could be expected to pay in addition to the amount initially demanded on the immediate purchase, or the amount of refunds or change that a consumer could expect to receive from the seller on the immediate purchase. Other possible variables of interest would also be obvious to a person having ordinary skill in the art. In an exemplary embodiment, a separate prediction market would be used to forecast each variable of interest.

The prediction aggregation mechanism also might report an indication of confidence in the outcome. For example, it might report the variance or other statistical quantitative measure of predictive assessments entered by predictors, or the volatility of a prediction market. Or, the prediction aggregation mechanism might be used to predict the absolute value of the difference between the consumer's reported satisfaction and the level of satisfaction represented by one of the aggregated predictions.

In one exemplary embodiment, a prediction market would be used to forecast the consumer's satisfaction as represented by gross consumer surplus, and a separate prediction market would be used to forecast the absolute difference between the reported satisfaction and the satisfaction forecast by an aggregated prediction at the time that a purchase is made.

Figure 9:
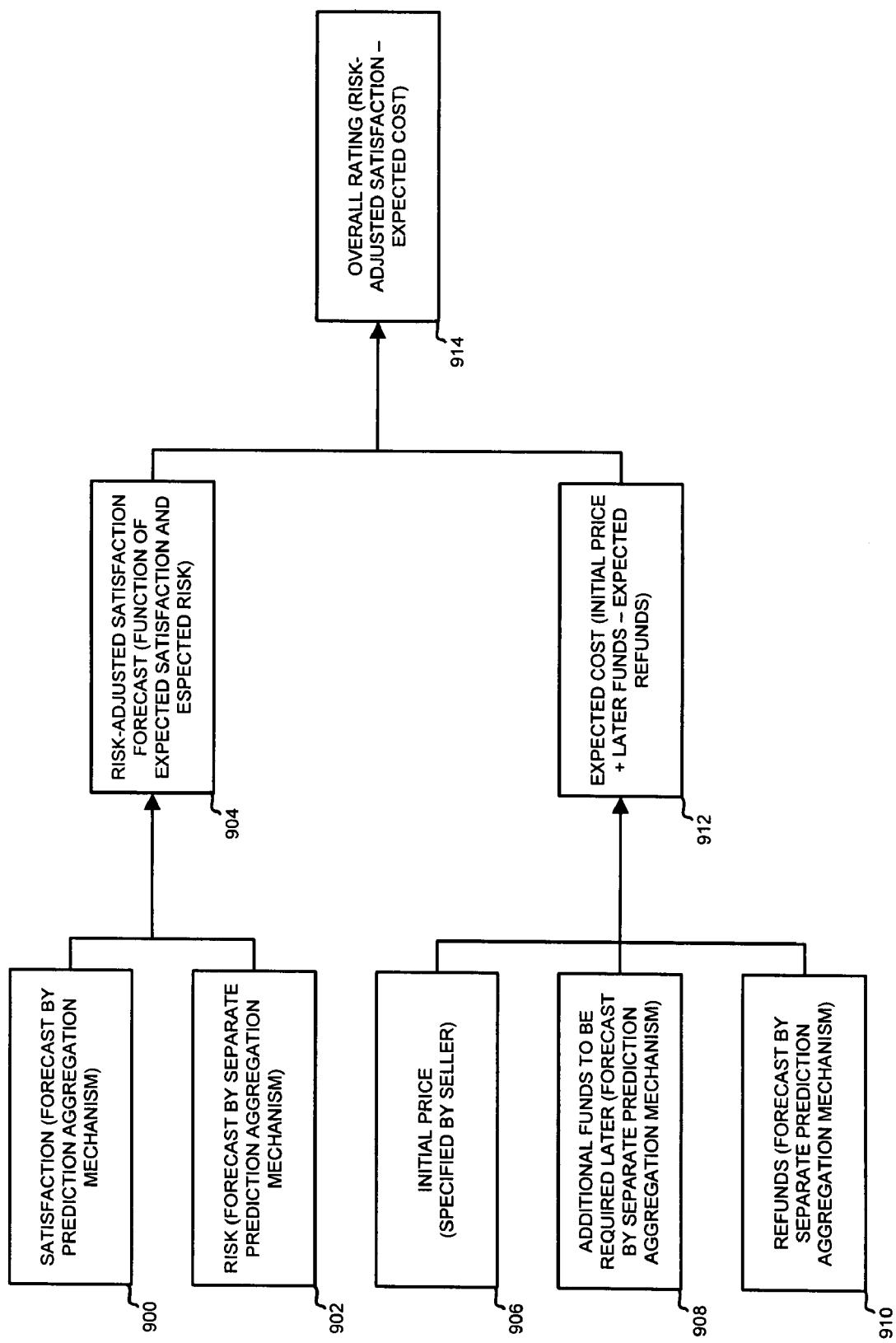
FIG. 9 exemplarily illustrates how the aggregated predictions from multiple prediction aggregation mechanisms can be aggregated, along with other information, to produce a single overall rating of an offer.

FIG. 9 illustrates how different prediction aggregation mechanisms can be aggregated in turn, possibly along with other information, to produce a single rating. One prediction aggregation mechanism 900 is used to forecast the buyer's satisfaction contingent on accepting a particular offer. A separate prediction aggregation mechanism 902 is used to forecast risk, for example by projecting the absolute difference between reported and forecast satisfaction. The aggregated predictions from these prediction aggregation mechanisms are then aggregated to produce a risk-adjusted satisfaction forecast 904, according to a formula, which may take into account the reported or observed degree of risk aversion in the buyer.

Meanwhile, a separate prediction aggregation mechanism 908 is used to forecast any additional money that the user can expect to pay in completing a transaction. This might be useful, for example, in an automobile repair transaction, where the seller might impose some initial charge to examine the car and then give an estimate of subsequent charges. Similarly, an additional prediction aggregation mechanism 910 is used to calculate refunds or change provided to the buyer.

The aggregated predictions from these mechanisms are aggregated along with the initial price specified by the seller 906 to produce an expected cost 912. The risk-adjusted satisfaction forecast 904 and the expected cost 912 are then aggregated in turn into an overall rating 914.

2. Conditional Aggregated Predictions

In illustrative embodiments of the present invention, the prediction aggregation mechanism is used to calculate the consumer's satisfaction conditional on making a purchase. Prediction aggregation mechanisms forecast a number that will become apparent in the future. The possibility that a consumer will not make a particular purchase, as well as the possibility that a consumer will make a purchase but fail to report the consumer's level of satisfaction in a timely way, thus presents a complication for the design of any prediction aggregation mechanism. There are a number of means of making conditional aggregated predictions, however, with prediction aggregation mechanisms.

For example, a consumer could be asked to report the satisfaction that the consumer believes that he or she would have had if the consumer had selected offers that the consumer in fact did not select. If the consumer failed to report a satisfaction level by a particular date, then the method could interpret this failure as equivalent to reporting a default level of satisfaction.

Alternatively, for offers not accepted, the prediction aggregation mechanism could be concluded with no money being awarded or charged. For example, if the prediction aggregation mechanism is a prediction market, all transactions could be unwound. That is, any money paid would be refunded, with no profit or loss possible. Recognizing that their profits would depend only on the transactions that are not unwound, predictors would have incentives to anticipate honestly how satisfied the consumer would be if the consumer in fact agrees to make a purchase. Other approaches to making conditional aggregated predictions of this sort would be obvious to a person having ordinary skill in the art, taking the present invention as a whole.

In an illustrative embodiment, a single prediction market is used to forecast all possible contingent events. Suppose that there are two offers. The prediction market might allow wagering on the event that the consumer will select the first offer and report satisfaction of 0 to 2, that the consumer will select the first offer and report satisfaction between 2 and 4, and so on, or that the consumer will select the second offer and report satisfaction of 0 to 2, and so on, or that the consumer will select the first offer but not report satisfaction, or that the consumer will select the second offer but not report satisfaction, or that the consumer will select some offer not yet made and report satisfaction of 0 and 2, and so on, or that the consumer will accept no offer by a specified date and report satisfaction of 0 and 2, and so on. Given probability forecasts for all possible contingent events, it is straightforward to calculate the relevant conditional probabilities.

For example, the conditional probability of the user reporting satisfaction of between 0 and 2 contingent on selection of the first offer and reporting satisfaction will be the absolute probability of the consumer's selecting the first offer and then reporting satisfaction of 0 and 2 divided by the sum of all the absolute probabilities associated with the consumer's selecting the first offer and making some later assessment of satisfaction. The various conditional probabilities corresponding to a particular offer can be individually multiplied by the midpoint of the ranges (e.g., 3 for between 2 and 4) and then summed to produce a point estimate. This is illustrated in Table 3 below.

TABLE 3

Example of calculating conditional predictions based on many separate probability forecasts

| User selects | Satisfaction | Forecast | Point estimate |
|---|---|---|---|
| Offer 1 | 0 <= s <= 2 | $p_1$ | $1 * p_1 + 3 * p_2 + 5 * p_3 +$ |
| Offer 1 | 2 < s <= 4 | $p_2$ | $7 * p_4 + 9 * p_5 /$ |
| Offer 1 | 4 < s <= 6 | $p_3$ | $(p_1 + p_2 + p_3 + P_4 + P_5)$ |
| Offer 1 | 6 < s <= 8 | $p_4$ | |
| Offer 1 | 8 < s <= 10 | $p_5$ | |
| Offer 1 | No report made | $p_6$ | |
| Offer 2 | 0 <= s <= 2 | $p_7$ | $1 * p_7 + 3 * p_8 + 5 * p_9 +$ |
| Offer 2 | 2 < s <= 4 | $p_8$ | $7 * p_{10} + 9 * p_{11} /$ |
| Offer 2 | 4 < s <= 6 | $p_9$ | $(p_7 + p_8 + p_9 + p_{10} + p_{11})$ |
| Offer 2 | 6 < s <= 8 | $p_{10}$ | |
| Offer 2 | 8 < s <= 10 | $p_{11}$ | |
| Offer 2 | No report made | $p_{12}$ | |
| Some future offer | 0 <= s <= 2 | $p_{13}$ | $1 * p_{13} + 3 * p_{14} + 5 *$ |
| Some future offer | 2 < s <= 4 | $p_{14}$ | $p_{15} + 7 * p_{16} + 9 * p_{17}/$ |
| Some future offer | 4 < s <= 6 | $p_{15}$ | $(p_{13} + p_{14} + p_{15} +$ |
| Some future offer | 6 < s <= 8 | $p_{16}$ | $p_{16} + p_{17})$ |
| Some future offer | 8 < s <= 10 | $p_{17}$ | |
| Some future offer | No report made | $p_{18}$ | |
| No offer | 0 <= s <= 2 | $p_{19}$ | $1 * p_{19} + 3 * p_{20} + 5 *$ |
| No offer | 2 < s <= 4 | $p_{20}$ | $p_{21} + 7 * p_{22} + 9 * p_{23}/$ |
| No offer | 4 < s <= 6 | $p_{21}$ | $(p_{19} + p_{20} + p_{21} +$ |
| No offer | 6 < s <= 8 | $p_{22}$ | $p_{22} + p_{23})$ |
| No offer | 8 < s <= 10 | $p_{23}$ | |
| No offer | No report made | $p_{24}$ | |

Another approach is to use a "combinatorial market," as described in the Hanson article cited above. A combinatorial market can be used to forecast the values of some number of variables, as well as the values of variables conditional on other variables. So, such a market could forecast the probability that the consumer will announce a satisfaction of between 0 to 2, the probability that the consumer will select offer 1, and so on, as well as the probability that the consumer will announce a satisfaction of 0 to 2 contingent on the probability that the consumer will select offer 1. Hanson shows that the logarithmic market scoring rule may be particularly well suited to a combinatorial market, although, as noted above, it may have some disadvantages.

With some designs of prediction aggregation mechanisms, some predictors may receive or be required to pay money even if a consumer never announces the consumer's level of transaction satisfaction. In a deliberative prediction market (also known as a "deliberative information market"), for example, the money that many predictors pay or receive depends on the value of the aggregated predictions at some period of time after each has made his or her predictive assessment. The closer the predictor is to the aggregated prediction at this later time, the better the compensation for that predictor. Michael Abramowicz, "Deliberative Information Markets for Small Groups," in Robert Hahn and Paul Tetlock (editors), "Information Markets: A New Way of Making Decisions in the Public and Private Sectors," at 101, AEI-Brookings Press 2006. The market is called "deliberative" because individual predictors will have an incentive to persuade others, for example in an online forum, of the wisdom of their evaluations.

The deliberative prediction market approached may easily be combined with the automated market maker described as the preferred embodiment above. The market is divided into individual "rounds" of specified time of at least $t_{min}$. The payoffs for predictors in a round will be determined based on the aggregated predictions at some later time after the end of a round, and no round will end at least until the payoffs are calculated for the previous round. The actual length of time could be set to $-h * \ln(rand(\,))/\ln(2)$, where rand( ) is a function producing a pseudorandom number uniformly distributed between 0 and 1, and ln is the natural logarithm function.

The randomization is made to prevent market manipulation, so that users will not be able to know exactly when the payoffs will be calculated. When payoffs are calculated, all "high" and "low" shares are redeemed as if the event being forecast (such as the consumer's announcement of a satisfaction level) occurred and produced a resolution value (such as the consumer's announcement of a satisfaction level) Of $p_{current}$. If the event (such as the consumer's announcement of a satisfaction level) occurs before shares are redeemed based on a later price, shares are redeemed based on the actual event.

Figure 10:
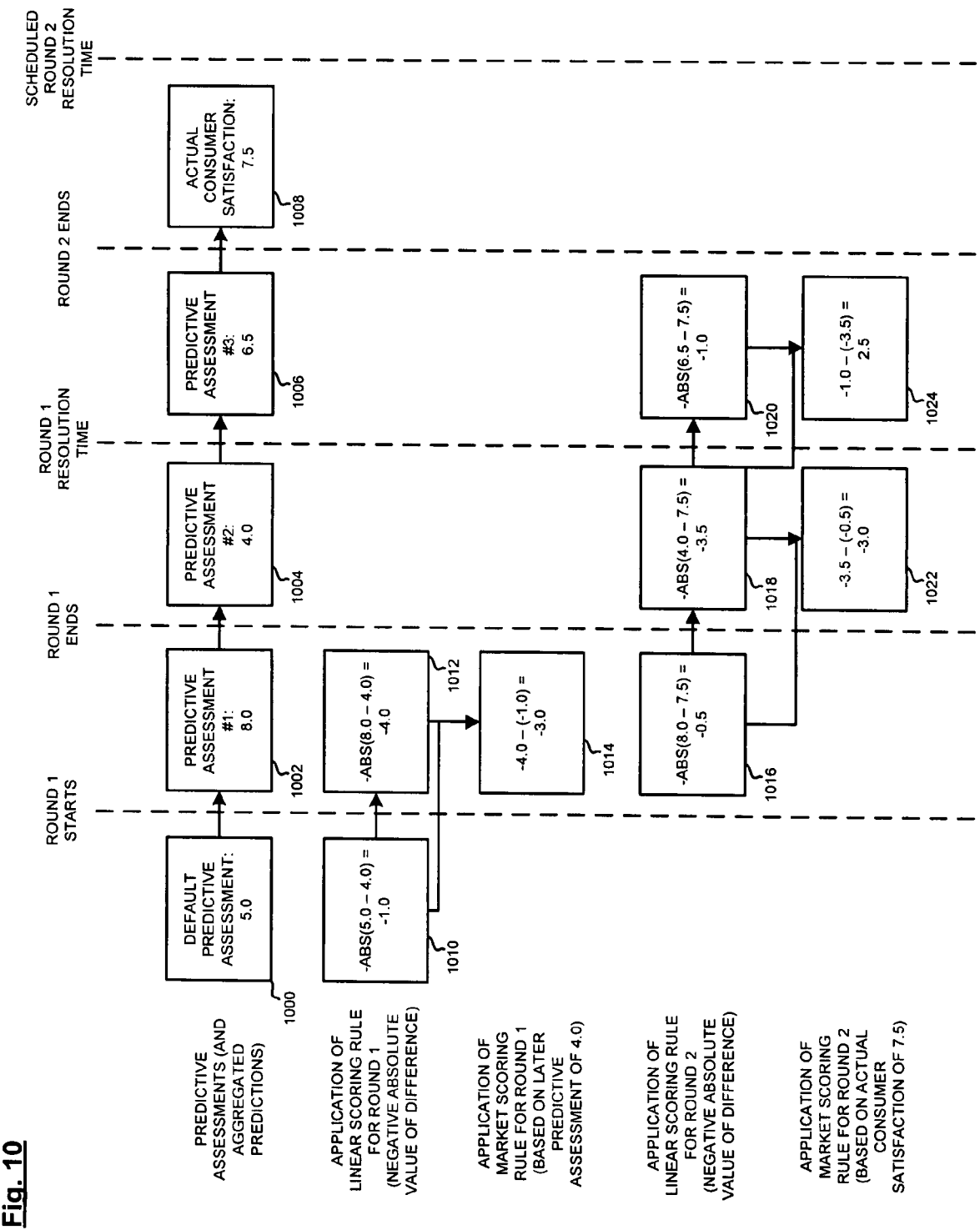
FIG. 10 illustrates the operation of a deliberative prediction market using the market scoring rule as an automated market maker.

FIG. 10 illustrates the use of the deliberative prediction market in conjunction with an automated market maker based on a linear scoring rule. In this example, only two rounds of predictive assessments occur before the buyer announces the buyer's satisfaction. The only predictive assessment in the first round, Predictive Assessment #1 1002, is resolved by the most recent predictive assessment at the randomly selected round 1 resolution 2, which here is predictive assessment #2 1004. The score for Predictive Assessment #1 is thus calculated by applying the linear scoring rule to both the Default Predictive Assessment 1000 and Predictive Assessment #1 1002, using Predictive Assessment #2 1004 as the resolution value.

The difference between the resulting values 1010, 1012 produces the score for Predictive Assessment #1 1014. The score for Predictive Assessment #2 1004, meanwhile, is calculated by applying the linear scoring rule to both Predictive Assessment #1 1002 and Predictive Assessment #2 1004, considering the actual announcement of consumer satisfaction 1008 as the resolution value. The difference between these values 1016, 1018 produces the score 1022 for Predictive Assessment #2. A similar approach is applied for scoring Predictive Assessment #3 1006, ultimately producing score 1024.

There are at least two advantages of this approach besides producing incentives to persuade others: First, predictors' investments (in the form of contract purchases) will not be tied up for as long a period of time. Second, this mechanism is well suited to making conditional predictions.

As noted above, a conditional market may be achieved by simply unwinding the market if the condition is not met. But individuals may be hesitant to tie up their money in a market that stands a good chance of being unwound. With the deliberative market approach, only outstanding rounds need to be unwound when it is determined that the condition will not occur (or appears to be extremely unlikely), reducing the risk cost that unwinding imposes on users.

Figure 11:
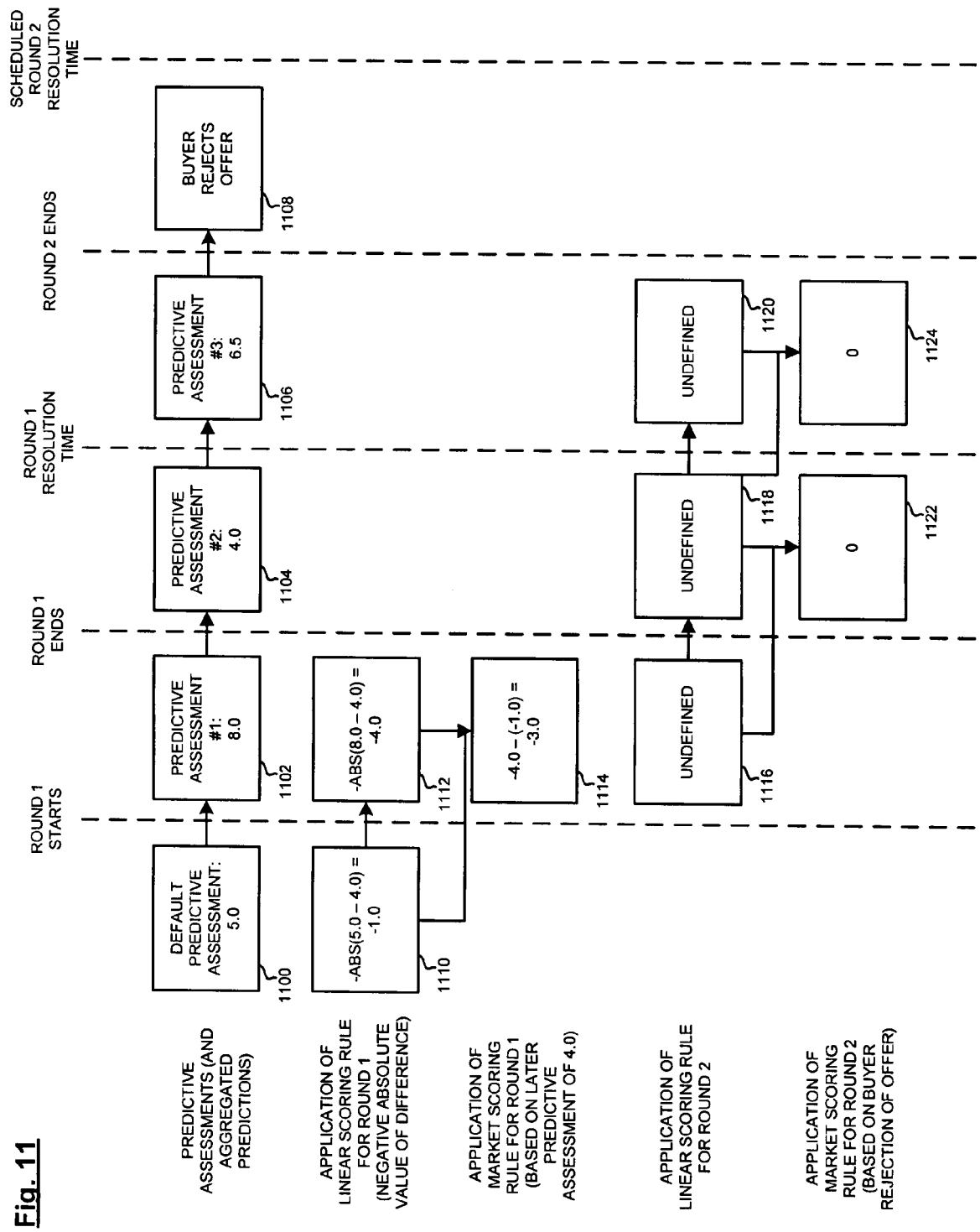
FIG. 11 illustrates how a deliberative prediction market can be used to unwind recent transactions when a buyer rejects an offer.

This is illustrated in FIG. 11. Here, the buyer rejects 1108 the offer before any of the Round 2 predictive assessments can be resolved. As a result, the linear scoring rule produces an undefined value for predictions to be assessed against this resolution (1116, 1118, and 1120), and the market scoring rule is defined to produce a score of 0 for the Round 2 predictive assessments 1122, 1124.

To minimize the burden on the consumer, a prediction aggregation mechanism may be designed so that the consumer will be solicited for feedback only some portion of the time. A randomization function may be used to determine after a purchase whether to solicit feedback from the consumer. A conditional prediction market or other conditional prediction aggregation mechanism may be used before a purchase to forecast the consumer's level of satisfaction if the consumer makes a purchase and that purchase is randomly selected, according to some probability p as determined by a pseudorandom number function, for consumer feedback.

The literature on prediction markets has shown how prediction markets may be used to have a claim "judged" only with some probability. Robin Hanson, "Could Gambling Save Science? Encouraging an Honest Consensus," Social Epistemology 9: 3, 7-9, 2005. In this invention, the "judging" is the solicitation of the consumer for a report of transaction satisfaction and the report of transaction satisfaction by that consumer.

It may be possible for the invention to function even without any consumer feedback or reporting of transaction satisfaction. A self-resolving prediction market functions in much the same way as a deliberative prediction market, except as to those predictors whose compensation has not yet been determined when the market closes. For similar designs, see Michael Abramowicz, "Cyberadjudication," Iowa Law Review, 86: 533, 2001. Those predictors may be compensated based on a variable such as the final predictive assessment at the time the market closed, or their predictive assessments may receive no compensation and incur no charges, i.e. be unwound.

Although such a market has no underlying fundamentals, each predictor's incentive is to seek to make a predictive assessment corresponding to whatever number will seem "focal" to other market participants, and so if the system associates a particular self-resolving prediction market with a particular predictive task (such as a consumer's satisfaction), predictors may attempt to forecast satisfaction even if it will never be measured.

There has been at least one experiment using a mechanism similar to the self-resolving prediction market to function as a focus group assessing hypothetical products (although not assessing particular offers to individual consumers as in the present invention). Nicholas Chan, Ely Dahan, Adlar Kim, Andrew Lo, & Tomaso Poggio, Securities Trading of Concepts (STOC) (2002), available at http://www.anderson.ucla.edu/faculty/ely.dahan/content/chan_dahan_lopoggio.pdf. The experiment appeared to reveal that market-based assessments were comparable to those that might be obtained from a focus group. A market need not be designated as self-resolving at the initiation of the market. In one embodiment, a deliberative prediction market is used to forecast consumer satisfaction, but if the consumer fails to report satisfaction by a particular time, then the market is closed and effectively becomes a self-resolving prediction market.

In another variation, a prediction aggregation mechanism may determine the payoffs to predictors at least in part by having a third party estimate the consumer's transaction satisfaction, or how satisfied the consumer should be. Suppose, for example, that a consumer is interested in purchasing homeowners' insurance. A prediction aggregation mechanism that forecasts how satisfied a consumer will be with a particular offer in, say, a few months, may not do a good job of providing advice to a consumer on which insurance product to select. This is because even after purchasing insurance, a consumer may not be in a good position to assess the quality of the insurance purchased. A prediction aggregation mechanism could therefore be used to forecast the assessment of a third party.

For example, a group of insurance experts could be designated, and the prediction aggregation mechanism could forecast the assessment of an expert to be randomly selected. An advantage of this approach is that if there is expected to be a difference of opinion in the expert group, the prediction aggregation mechanism will produce an aggregated prediction that effectively assigns some weight to different possible views. The consumer is thus presented with a forecast that can be seen as constituting the conventional wisdom among a group of experts.

This may be more useful to a consumer than hiring any particular expert, because, when a consumer hires a particular expert, it is difficult for the consumer to assess whether that expert is an outlier. In addition, if consultation with an expert is expensive, the prediction aggregation mechanism can solicit the transaction rating from an expert with some probability p, dependent on the result of a randomization function. Such randomization is no different when the transaction is to be assessed by a third party than when it is to be assessed by the consumer himself or herself, as described above.

Figure 12:
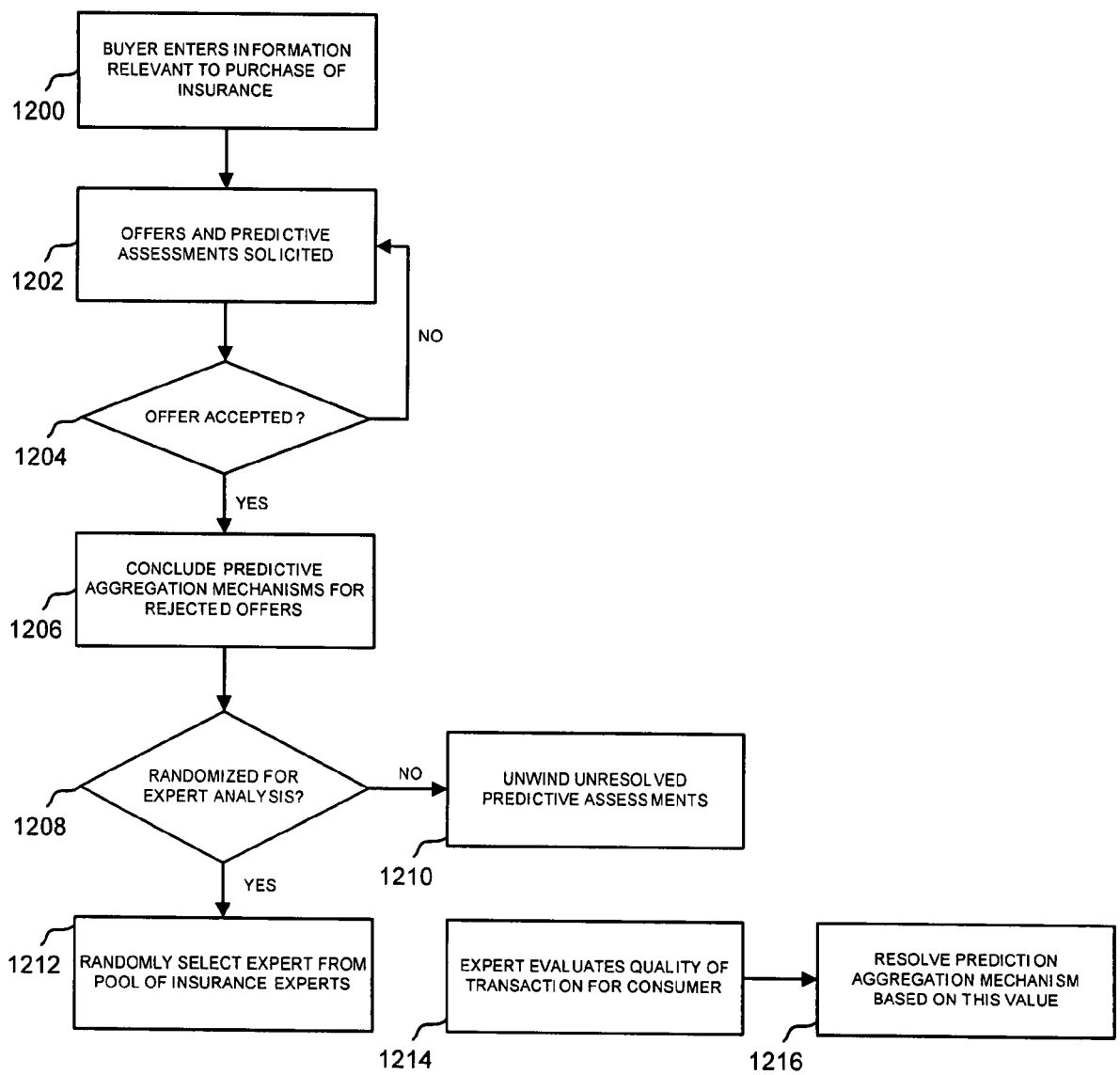
FIG. 12 provides a flow diagram illustrating how an expert can be selected with some positive probability to provide a transaction satisfaction report on behalf of a purchaser of insurance.

FIG. 12 is a flow diagram illustrating this approach. First, the buyer enters information relevant to the purchase of insurance, such as information on other insurance coverage, sex, age, etc., step 1200. Then, offers and predictive assessments are solicited in step 1202, and if an offer is eventually selected, in step 1204, predictive aggregation mechanisms for rejected offers are concluded in step 1206, for example, by unwinding the most recent transactions.

A randomization function is executed to determine whether this transaction should be selected for expert analysis (step 1208). If not, then any unresolved predictive assessments for the prediction aggregation mechanism corresponding to the accepted offer are unwound in step 1210. If so, an expert is randomly selected in step 1212, and the expert evaluates the quality of the transaction based on the data input by the consumer in step 1214. The prediction aggregation mechanism is resolved based on this value in step 1216, rather than on the basis of consumer feedback.

Another reason to have the prediction aggregation mechanism forecast an evaluation by someone other than the user who has made an initial request is to constrain the individual making the purchase.

For example, a business might assign a particular employee to make certain purchases on behalf of the business by using the system described in this invention. The business might, however, choose to designate either another employee or a third party to evaluate transaction satisfaction. That way, predictors will not take into account any idiosyncratic preferences expressed by the employee of the business who has made the request, and the business can be alerted when employees make purchases that the system has not recommended. This may help the business give its purchasers incentives to consider the preferences of individuals other than themselves in making purchases.

In a variation, the prediction aggregation mechanism can accommodate such needs by allowing a consumer to specify some other user who will evaluate the transaction. A similar approach may be particularly useful for a governmental entity, if there is concern that procurement officials may not have adequate incentives to make purchases that ultimately will be to the benefit of taxpayers.

Thus, the prediction aggregation mechanism can allow a government entity acting as a consumer to specify a procedure for selecting someone, for example, a voter, a judge, a member of a legislative body, or a member of an administrative agency, to evaluate a particular purchase. Note that even if consumer satisfaction ratings produced in this way are quite noisy, for example, because the ideology or personality of the selected voter affects assessments, the forecasts of consumer satisfaction may average out this noise and be quite useful to government decisionmakers. The potential of prediction markets to average normative preferences of governmental decisionmakers is disclosed in the context of cost-benefit analysis in Michael Abramowicz, "Information Markets, Administrative Decisionmaking, and Predictive Cost-Benefit Analysis," University of Chicago Law Review 71: 933, 2004.

In one possible embodiment, in addition to forecasting a consumer's satisfaction conditional on acceptance of specific offers, one or more prediction aggregation mechanisms would be used to forecast a consumer's satisfaction conditional on accepting no offer, either over some designated period of time or over some longer period of time. For example, a conditional prediction market could be used to forecast the consumer's ultimate satisfaction if the consumer eventually decides to make no purchases. Similarly, a conditional prediction market could be used to forecast the consumer's ultimate satisfaction if the consumer declines to make a purchase within some period of time, and another similar conditional prediction market might be created after that time.

Given forecasts from these prediction aggregation mechanisms, the system can advise the consumer about the relative attractiveness of declining all offers, waiting for more offers, and accepting the offer that is forecast to produce the greatest consumer satisfaction.

3. Subsidization of Predictors

An aspect of prediction aggregation mechanisms and of scoring rules is that predictors can make or lose money (or points) depending on the accuracy of their predictive assessments. A prediction aggregation mechanism, however, need not be a zero sum game, one in which the money that one predictor makes necessarily come at the expense of other predictors. Instead, the prediction aggregation mechanism may be subsidized, so that on average predictors make money rather than lose money. Subsidization may help induce predictors to participate in the system.

Mechanisms for subsidizing prediction aggregation mechanisms are well known in the art. A scoring rule, for example, is a rule directly relating the subsidy to the accuracy of the forecast. Although a scoring rule can allow for the possibility of a negative score, i.e., one that would subject the predictor to making a payment, careful design of the formula can ensure that at least some potential predictors will make money. A scoring rule can also be designed in a way so that there is some upper limit on the maximum amount of money that the sponsor of the scoring rule might pay.

Similarly, with the market scoring rule, a sponsor of the rule or of a prediction market using the rule can subsidize the market and limit the maximum potential exposure from the rule. An automated market maker, by offering to enter into purchases or sales automatically, can generally be expected to lose money, because predictors will enter into purchases or sales only when they expect that doing so would be profitable. Once again, the maximum amount of money that can be lost is calculable.

As these examples suggest, the amount of subsidy for a particular application of a prediction aggregation mechanism or a scoring rule may not always be predictable in advance. For the present invention, this may well be beneficial, because greater subsidies may tend to be awarded where there is a greater need to induce participation by predictors.

Consider, for example, a prediction market operating with an automated market maker that produces a default aggregated prediction before any predictive assessments are made by predictors. This default aggregated prediction may be more reliable in some cases, for example, where transaction satisfaction can be relatively easily predicted by a regression model, than in others. Predictors will be more likely to participate in prediction markets in which they expect that their ultimate predictive assessments will lead on average to a relatively large absolute change in the magnitude of the aggregated predictions, because large shifts bring the possibility of higher rewards.

A prediction aggregation mechanism may be designed so as to have higher or lower subsidies at different times. For example, use of a prediction market with the market scoring rule might be seen as providing excessive incentive for predictors to make the first predictive assessment after the announcement of a default aggregated prediction, because initial corrections of a default aggregated prediction may be "easier" than subsequent improvements on predictive assessments made by other predictors. One way of achieving this is to specify a dampening factor, so that points earned by a first predictor according to the market scoring rule would be multiplied by this dampening factor before being issued.

There are numerous possible sources for market subsidies. In one illustrative embodiment, the business owner operating the system might provide for specific amounts of money to be awarded in specified periods of time. For example, the operator might promise to distribute $10,000 combined to predictors in the month of January. The exact amount of money received by each predictor could then be a function of the total points earned by the predictor in the month of January. A "floor" might establish a minimum number of points that must be earned by a predictor before the predictor will be eligible for converting any points into other forms of money.

In some embodiments, when the predictor is below this floor, the predictive assessments of the predictor will have no effect or less effect on the aggregated predictions offered by the predictor, to prevent predictors with nothing to lose from manipulating the market. In another embodiment, participants would be permitted to cash in points at any time, potentially subject to some restrictions, at an exchange rate that might vary over time.

It may also be possible for money to be distributed on a transaction-by-transaction basis. For example, the operator of the system might provide that the subsidy for the prediction aggregation mechanism shall come from a fraction of the fees paid by a seller if the seller's offer should be accepted by a consumer. That subsidy might be distributed in proportion to points earned on only prediction aggregation mechanisms corresponding to the specific offer, in which case points for prediction aggregation mechanisms corresponding to rejected offers would then be counted as worthless, effectively unwinding transactions in those prediction aggregation mechanisms. Alternatively, the subsidy might be distributed in proportion to points earned on all prediction aggregation mechanisms corresponding to the consumer's request. With either of these approaches, a separate source of subsidy might be needed to subsidize the prediction aggregation mechanism forecasting the consumer's satisfaction in the event that the consumer rejects all offers, if a subsidy for this market is desired.

The system need not provide a means for points to be converted into money. Predictors may wish to participate solely for the enjoyment of rating potential transactions, or because they hope to earn reputations as high-quality predictors. Alternatively, prizes might be made available, for example awarded to a group of highest-scoring predictors, or alternatively on a random basis, with higher-scoring predictors having higher probabilities of winning one or more prizes. Different subsidy mechanisms might be combined, so for example many predictors could receive a share of the pot.

Meanwhile, the system need not use a system of points at all. If prediction markets are used as the prediction aggregation mechanism, for example, all transactions could be expressed in a currency such as dollars, and thus no conversion of points to dollars would be necessary. A potential advantage, however, of having a prediction aggregation mechanism at least initially denominated in points is that it may help avoid the regulatory obstacles of gambling regulation. In some jurisdictions, gambling laws may not prevent predictors from gaining or losing points based on their predictive assessments, even if those same jurisdictions would bar a system in which predictors can gain or lose money. This may be so even if points ultimately can be converted to cash, as long as no predictor can lose money in a transaction.

It should be understood that the above-described embodiments of the invention are illustrative only.

Exemplary Software Implementation

Figure 13:
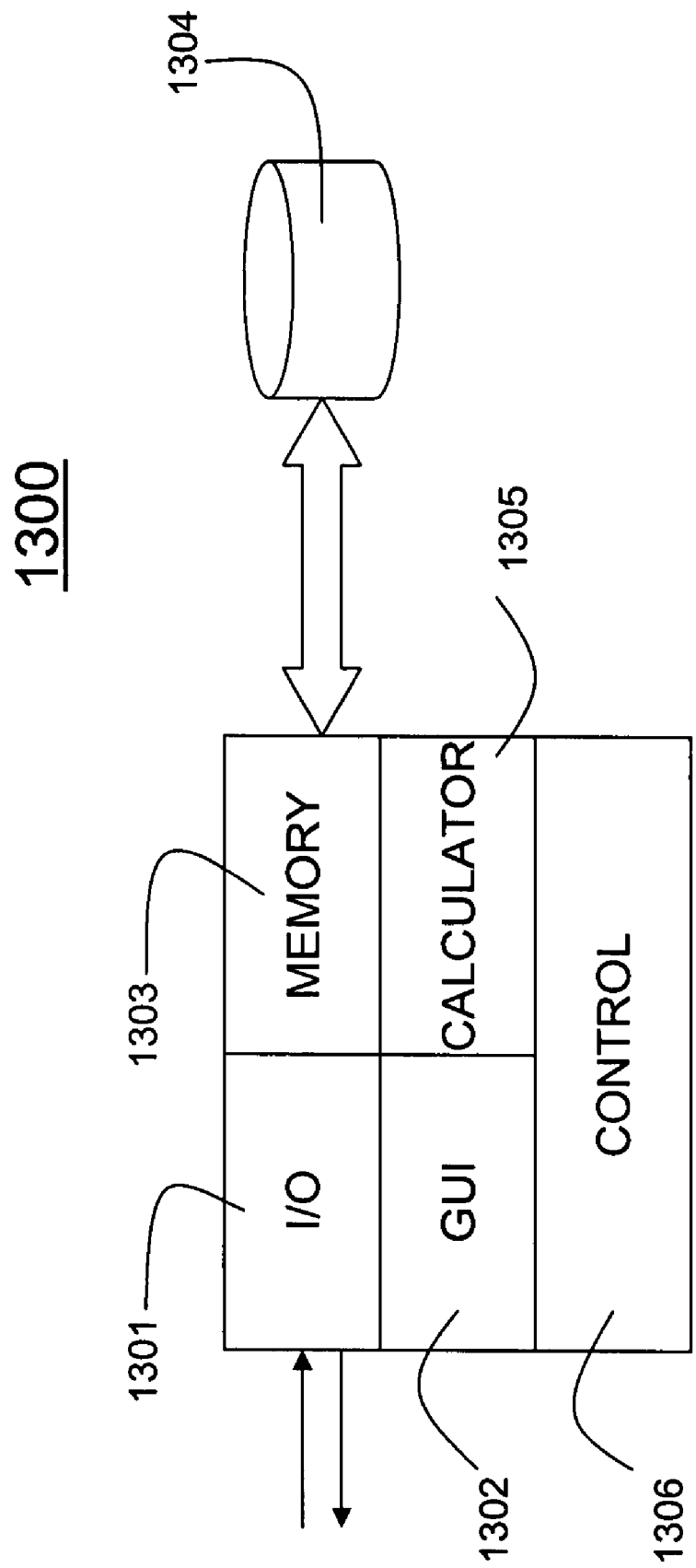
FIG. 13 provides an exemplary block diagram 1300 of a software module of an application program that implements the concepts of the present invention.

FIG. 13 exemplarily illustrates a block diagram 1300 of a software module that implements the present invention in, for example, an application program that might reside in a server such as discussed earlier. I/O module 1301 receives/transmits instructions from system users, whether such users be clients using remote terminals, mobile phones, laptops, etc., or the administrator of the server itself. I/O module 1301 would interface with a graphical user interface (GUI) module 1302 that provides the appropriate display for the specific user functions.

I/O module 1301 would also interface with the memory interface module 1303 that exchanges data to and from memory unit 1304. Calculator module 1305 provides subroutines having the various mathematical algorithms described above, for deriving such results as the prediction aggregation. Control module 1306 comprises a primary function of the application software module that invokes the various subroutines as required, based on external events such as user inputs.

Exemplary Hardware Implementation

Figure 14:
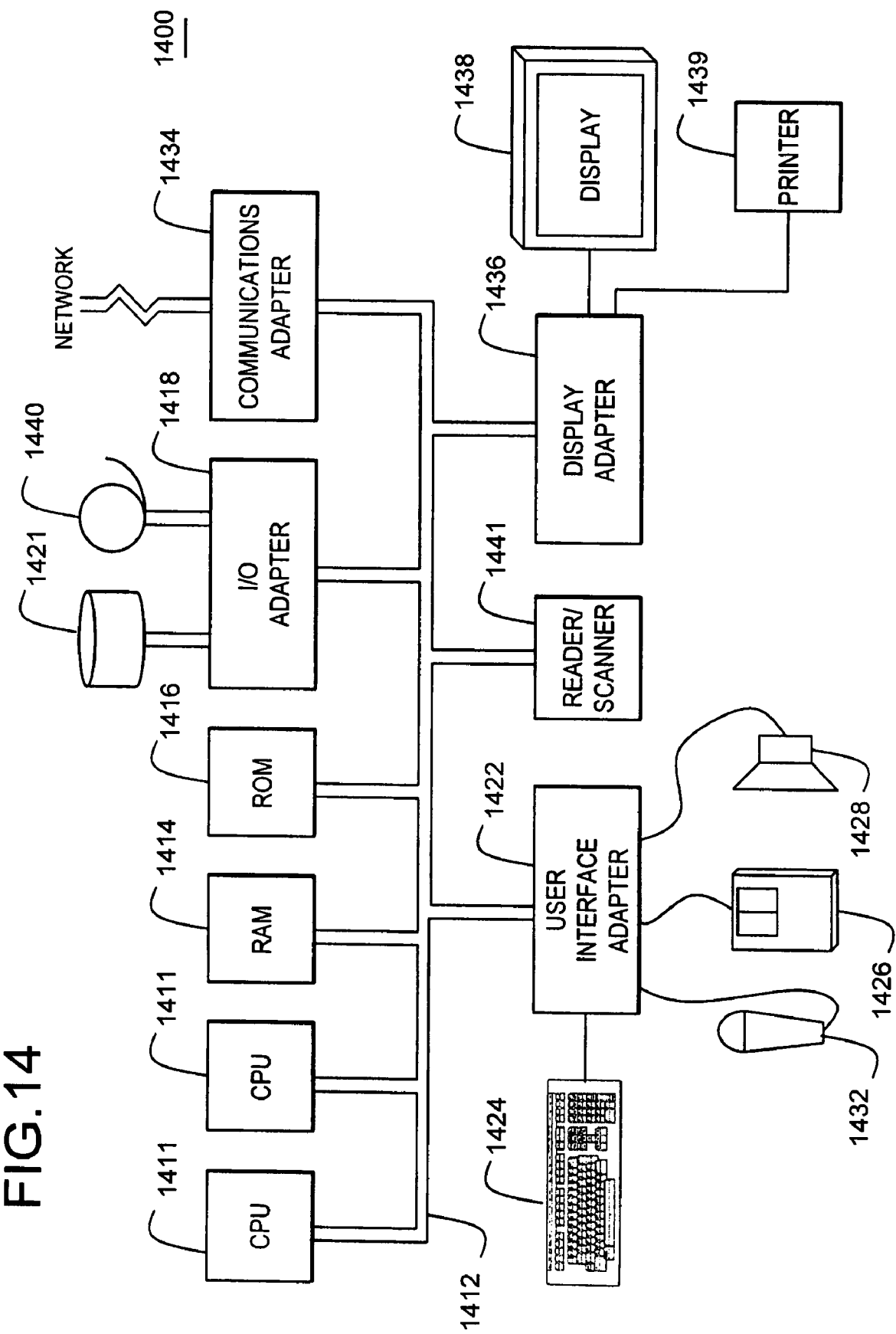
FIG. 14 illustrates an exemplary hardware/information handling system 1400 for incorporating the present invention therein.
Figure 15:
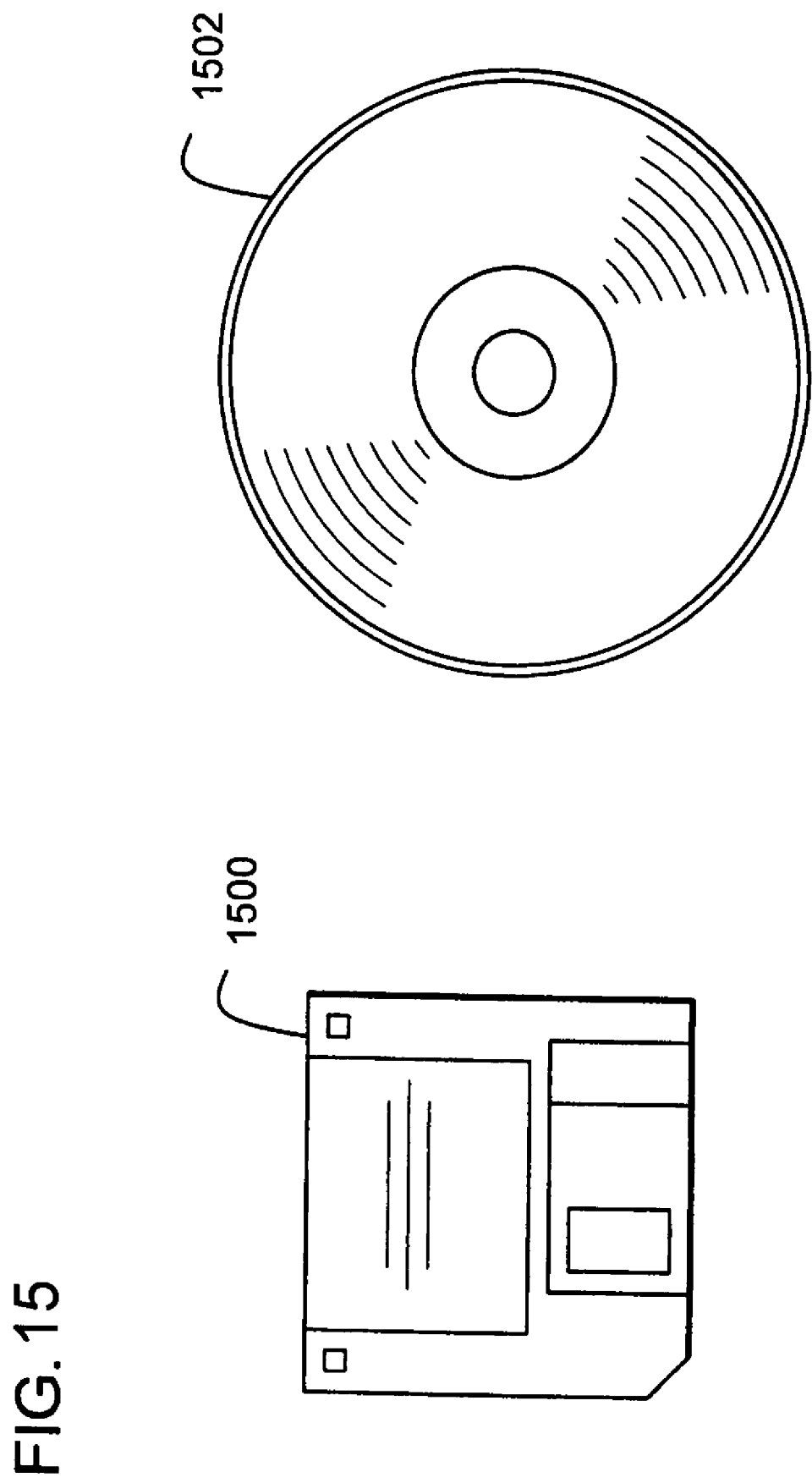
FIG. 15 illustrates a signal bearing medium 1500 (e.g., storage medium) for storing steps of a program of a method according to the present invention.

FIG. 14 illustrates a typical hardware configuration of an information handling/computer system in accordance with the invention and which preferably has at least one processor or central processing unit (CPU) 1411.

The CPUs 1411 are interconnected via a system bus 1412 to a random access memory (RAM) 1414, read-only memory (ROM) 1416, input/output (I/O) adapter 1418 (for connecting peripheral devices such as disk units 1421 and tape drives 1440 to the bus 1412), user interface adapter 1422 (for connecting a keyboard 1424, mouse 1426, speaker 1428, microphone 1432, and/or other user interface device to the bus 1412), a communication adapter 1434 for connecting an information handling system to a data processing network, the Internet, an Intranet, a personal area network (PAN), etc., and a display adapter 1436 for connecting the bus 1412 to a display device 1438 and/or printer 1439 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1411 and hardware above, to perform the method of the invention.

This signal-bearing media may include, for example, a RAM contained within the CPU 1411, as represented by the fast-access storage for example. Alternatively, the instructions may be contained in another signal-bearing media, such as a magnetic data storage diskette 1500 (FIG. 15), directly or indirectly accessible by the CPU 1411.

Whether contained in the diskette 1500, the computer/CPU 1411, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

The present invention offers a variety of advantages over previous approaches to providing information to consumers. The invention can harness information from diverse sources about the suitability of particular goods or services, as offered by particular individuals, for particular consumers. Because this information depends on the evaluations of independent predictors who have financial incentives to make accurate predictive assessments, consumers will not need to spend as much effort assessing the honesty and motivations of those who offer them advice. They can also be confident that those providing them with information will seek to respond to the consumers' individual needs, as described by those consumers. This invention may be useful for a wide array of goods and services, and may be especially useful for purchases that are cognitively demanding, such as health care products, legal services, and insurance. It may be useful in an e-commerce environment or in a more traditional retail setting.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described my invention, what I claim as new and desire to secure by Letters Patent is as follows:

1. An apparatus, comprising:
a processor;
an input section for receiving user inputs including a request from a consumer describing one or more transactions in which said consumer may wish to engage, at least one offer from at least one potential seller of said one or more transactions, and one or more predictive assessments from predictors corresponding to said at least one offer, each said predictive assessment predicting a satisfaction said consumer will experience contingent on accepting one or more offers from said at least one potential seller;

a memory for storing said user inputs including said consumer request, each said at least one offer, and each said at least one or more predictive assessments being stored in said memory; and a calculator, as executed by the processor, that retrieves data from said memory and performs processing on said data, including using said predictive assessments to calculate at least one aggregated prediction for said at least one offer, based on a prediction aggregation mechanism that includes an algorithm that simultaneously determines a collective forecast and a gain or loss of money or points for each predictor, said gain or loss depending at least in part on predictive assessments of other predictors who have earlier or are simultaneously making predictive assessments.

2. The apparatus of claim 1, as comprising a server on a network.

3. The apparatus of claim 1, wherein said prediction aggregation mechanism further calculates a compensation for said predictors based upon an accuracy of said predictive assessments.

4. The apparatus of claim 3, wherein said compensation comprises at least one of money and points and said compensation is one of positive and negative in value.

5. The apparatus of claim 1, wherein said input section further receives a response from said consumer reporting said satisfaction that affects the compensation for said predictors.

6. The apparatus of claim 5, wherein said response comprises a report by said consumer of a gross consumer surplus of said consumer.

7. The apparatus of claim 1, wherein said input section further receives a response from an individual other than the consumer: said response reporting a quality of the offer or of a good or a service received by the consumer, said response affecting a compensation of said predictors.

8. The apparatus of claim 1, wherein said prediction aggregation mechanism adjusts a predictive assessment by a predictor based upon an historical accuracy for said predictor.

9. The apparatus of claim 1, wherein said prediction aggregation mechanism comprises at least one of:
 a market scoring rule;
 a prediction market;
 an automated market maker;
 a pari-mutuel market; and
 a dynamic pari-mutuel market.

10. The apparatus of claim 1, wherein a financial transaction selectively is automatically executed for the consumer user depending at least in part on the aggregated predictions for one or more offers submitted in response to the consumer user's request.

11. The apparatus of claim 1, wherein said input section permits a plurality of sellers, not all of which are under an economic control of a single individual or entity, to make offers to said consumer.

12. The apparatus of claim 1, wherein a seller must pay a fee to make an offer to said consumer.

13. The apparatus of claim 1, wherein said calculator identifies a type of request that the consumer is making and said input section receives from said consumer answers to one or more questions corresponding to said request type.

14. The apparatus of claim 1, wherein said prediction aggregation mechanism reports both of:
 at least one first aggregated prediction reflecting a forecast of said satisfaction of said consumer; and
 at least one additional aggregated prediction reporting confidence in said first aggregated prediction.

15. The apparatus of claim 1, wherein said input section further receives one or more predictive assessments from said predictors corresponding to a condition in which the consumer refuses all offers, and said calculator uses said predictive assessments to calculate at least one aggregated prediction for said condition.

16. The apparatus of claim 1, wherein
said calculator ranks all offers based at least in part on one or more of the aggregated predictions for these offers or identifies one or more of the offers as a best offer or offers to consider based at least in part on one or more of the aggregated predictions for all offers.

17. The apparatus of claim 1, wherein
said calculator automatically agrees to one or more offers on behalf of said consumer.

18. A machine-readable storage medium tangibly embodying a program of machine-readable instructions executable by a digital processing apparatus to perform a method for predicting a satisfaction that a consumer will experience contingent on accepting one or more offers from potential sellers, said method comprising:
 receiving one or more offers from one or more potential sellers in response to a request from a consumer describing one or more transactions in which the consumer may wish to engage;
 receiving one or more predictive assessments from predictors corresponding to one or more of these offers, each said predictive assessment predicting a satisfaction that said consumer will experience contingent on accepting one or more offers from said potential sellers; and
 calculating, for one or more of these offers, at least one aggregated prediction based on the corresponding predictive assessments, according to a prediction aggregation mechanism that includes an algorithm that simultaneously determines a collective forecast and a gain or loss of money or points for each predictor, said gain or loss depending at least in part on predictive assessments of other predictors who have earlier or are simultaneously making predictive assessments.

19. A computer-implemented method for predicting a satisfaction a consumer will experience contingent on accepting one or more offers from potential sellers, said method comprising:
 receiving one or more offers from one or more potential sellers in response to a request from a consumer describing one or more transactions in which the consumer may wish to engage;
 receiving one or more predictive assessments from predictors corresponding to one or more of these offers, each said predictive assessment predicting a satisfaction that said consumer will experience contingent on accepting one or more offers from said potential sellers; and
 calculating, using a processor on a computer, for one or more of these offers, at least one aggregated prediction based on the corresponding predictive assessments, according to a prediction aggregation mechanism that includes an algorithm that simultaneously determines a collective forecast and a gain or loss of money or points for each predictor, said gain or loss depending at least in part on predictive assessments of other predictors who have earlier or are simultaneously making predictive assessments.

* * * * *